US012656915B2

(12) United States Patent
Kim et al.

(10) Patent No.: US 12,656,915 B2
(45) Date of Patent: Jun. 16, 2026

(54) ELECTRONIC DEVICE

(71) Applicant: Samsung Display Co., Ltd., Yongin-si (KR)

(72) Inventors: Hyungbae Kim, Yongin-si (KR); Sanghyun Lim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/007,944

(22) Filed: Jan. 2, 2025

(65) Prior Publication Data

US 2025/0291443 A1      Sep. 18, 2025

(30) Foreign Application Priority Data

Mar. 12, 2024      (KR) ......................... 10-2024-0034437

(51) Int. Cl.
*G06F 3/044* (2006.01)

(52) U.S. Cl.
CPC .......... *G06F 3/0443* (2019.05); *G06F 3/0446* (2019.05); *G06F 2203/04102* (2013.01)

(58) Field of Classification Search
CPC ................. G06F 3/0443; G06F 3/0446; G06F 2203/04102
See application file for complete search history.

(56) References Cited

U.S. PATENT DOCUMENTS

| | | |
|---|---|---|
| 10,705,635 B2 | 7/2020 | Kim et al. |
| 10,969,911 B2 | 4/2021 | Kim et al. |

| | | | | |
|---|---|---|---|---|
| 2012/0075224 A1* | 3/2012 | Chang | ..................... | G06F 3/041 |
| | | | | 345/173 |
| 2015/0268794 A1* | 9/2015 | Yang | ..................... | G06F 3/0445 |
| | | | | 345/174 |
| 2016/0148034 A1* | 5/2016 | Kremin | .............. | G06V 40/1306 |
| | | | | 382/124 |
| 2016/0378265 A1* | 12/2016 | Katsurahira | .......... | G06F 3/0442 |
| | | | | 345/174 |
| 2017/0017343 A1* | 1/2017 | Chen | ..................... | G06F 3/0418 |
| 2017/0075498 A1* | 3/2017 | Zhuang | .................. | H10D 86/60 |
| 2017/0168604 A1* | 6/2017 | Schwartz | ............ | G06F 3/04166 |
| 2017/0192610 A1* | 7/2017 | Park | .................. | G02F 1/134309 |

(Continued)

FOREIGN PATENT DOCUMENTS

| | | |
|---|---|---|
| CN | 115981506 | 4/2023 |
| KR | 10-2153915 | 9/2020 |
| KR | 10-2456701 | 10/2022 |

*Primary Examiner* — Md Saiful A Siddiqui
(74) *Attorney, Agent, or Firm* — F. CHAU & ASSOCIATES, LLC

(57)          ABSTRACT

An electronic device includes a display layer, a sensor layer disposed on the display layer and including an active region and a peripheral region adjacent to the active region, and a sensor driver that drives the sensor layer. The sensor layer includes a plurality of sensing electrodes disposed in the active region, a plurality of sensing lines disposed in the peripheral region and connected to the plurality of sensing electrodes, and a noise measuring electrode disposed in the peripheral region. The noise measuring electrode includes a first electrode, and a second electrode. The sensor driver includes a first differential circuit including a first input terminal electrically connected to one of the plurality of sensing lines, and a second input terminal electrically connected to the first electrode.

20 Claims, 17 Drawing Sheets

(56)                 References Cited

U.S. PATENT DOCUMENTS

| | | | |
|---|---|---|---|
| 2019/0012034 A1* | 1/2019 | Liang ...................... | G06F 3/044 |
| 2020/0103993 A1* | 4/2020 | Krah ................... | G06F 3/04182 |
| 2021/0041988 A1* | 2/2021 | Fotopoulos ........... | G06F 3/0418 |
| 2022/0317803 A1* | 10/2022 | Yun ....................... | G06F 3/0443 |
| 2023/0147261 A1* | 5/2023 | Zhang ................ | G06F 3/04164 |
| | | | 345/173 |
| 2024/0257779 A1* | 8/2024 | Kim ................... | G06F 3/04184 |

* cited by examiner

FIG. 2

ELECTRONIC DEVICE

CROSS-REFERENCE TO RELATED APPLICATIONS

This application claims priority to and benefits of Korean Patent Application No. 10-2024-0034437 under 35 U.S.C. § 119, filed on Mar. 12, 2024, in the Korean Intellectual Property Office (KIPO), the entire contents of which are incorporated herein by reference.

BACKGROUND

1. Technical Field

Embodiments of the disclosure described herein relate to an electronic device improved in sensing reliability and sensing accuracy.

2. Description of the Related Art

Multimedia electronic devices, such as a television (TV), a cellular phone, a tablet computer, a navigation system, and a game console, include an electronic device that displays an image. Electronic devices may include a sensor layer that provides a touch-based input for enabling a user to intuitively, conveniently, and readily input information or a command, in addition to a typical input, such as a button, a keyboard, or a mouse. The sensor layer may sense the touch by a physical body of a user.

SUMMARY

Embodiments of the disclosure provide an electronic device improved in sensing reliability and sensing accuracy.

According to an embodiment of the disclosure, an electronic device may include a display layer, a sensor layer disposed on the display layer and including an active region and a peripheral region adjacent to the active region, and a sensor driver that drives the sensor layer. The sensor layer may include a plurality of sensing electrodes disposed in the active region, a plurality of sensing lines disposed in the peripheral region and connected to the plurality of sensing electrodes, respectively, and a noise measuring electrode disposed in the peripheral region. The noise measuring electrode may include a first electrode spaced apart from the plurality of sensing electrodes while the plurality of sensing lines interposed between the first electrode and the plurality of sensing electrodes, and a second electrode adjacent to the first electrode. The sensor driver may include a first differential circuit including a first input terminal electrically connected to one of the plurality of sensing lines, and a second input terminal electrically connected to the first electrode.

The sensor layer may further include a resistance control circuit electrically connected between the first electrode and the first input terminal.

The resistance control circuit may include a variable resistor.

The electronic device may further include a flexible substrate. The sensor driver may be mounted on the flexible substrate, and the resistance control circuit may be mounted on the flexible substrate.

The first electrode and the second electrode may be disposed in different layers and overlap each other in a plan view.

The first electrode and the second electrode may be spaced apart from the plurality of sensing lines in a first direction in a plan view, and each of the first electrode and the second electrode may extend in a second direction intersecting the first direction.

Each of the first electrode and the second electrode may include a first part extending in the second direction, adjacent to the sensor driver, and having a first width in the first direction, and a second part extending in the second direction, spaced apart from the sensor driver while the first part interposed between the second part and the sensor driver, and having a second width greater than the first width in the first direction.

Each of the first electrode and the second electrode may include a first part spaced apart from the plurality of sensing lines in the first direction and extending in a second direction intersecting the first direction, and a second part extending from an end of the first part in the first direction.

The first electrode and the second electrode may be disposed in a same layer, and the second electrode may be electrically connected to a ground pad of the sensor driver.

The second electrode may include a first part spaced apart from the plurality of sensing lines in the first direction while the first electrode interposed between the first part and the plurality of sensing lines and extending in a second direction intersecting the first direction, and a second part extending in the first direction from an end of the first part.

The first electrode may include a first auxiliary electrode and a second auxiliary electrode, and the first auxiliary electrode and the second auxiliary electrode may be disposed in different layers and connected with each other through a contact hole.

The first electrode and the second electrode may be spaced apart from the plurality of sensing lines in a first direction in a plan view, and each of the first electrode and the second electrode may include a first part extending in a second direction intersecting the first direction, and a second part extending from the first part and having a pattern.

The sensor driver may further include a second differential circuit including a first input terminal connected to the one of the plurality of sensing lines, and a second input terminal connected to another one of the plurality of sensing lines, and the first input terminal of the first differential circuit may be connected to the second differential circuit.

The sensor driver may further include a filter connected to the first differential circuit.

According to an embodiment of the disclosure, an electronic electrode may include a display layer, and a sensor layer disposed on the display layer and including an active region and a peripheral region adjacent to the active region. The sensor layer may include a plurality of sensing electrodes disposed in the active region, a plurality of sensing lines disposed in the peripheral region and connected to the plurality of sensing electrodes, respectively, and a noise measuring electrode disposed in the peripheral region. The noise measuring electrode may include a first electrode spaced apart from the plurality of sensing electrode while the plurality of sensing lines interposed between the first electrode and the plurality of sensing electrodes, and a second electrode disposed under the first electrode and overlap the first electrode in a plan view. The first electrode and the second electrode may form a noise capacitor.

The electronic device may further include a sensor driver including a first differential circuit including a first input terminal electrically connected to one of the plurality of sensing lines, and a second input terminal electrically connected to the first electrode.

The sensor layer may further include a resistance control circuit electrically connected between the first electrode and the first input terminal, and including a variable resistor.

The first electrode and the second electrode may be spaced apart from the plurality of sensing lines in a first direction in a plan view, and each of the first electrode and the second electrode may extend in a second direction intersecting the first direction.

The first electrode and the second electrode may be spaced apart from each other.

The display layer may include an anode electrode, an emission layer disposed on the anode electrode, and a cathode electrode disposed on the emission layer, and a capacitance of the noise capacitor may be greater than a capacitance of a parasitic capacitor formed between the first electrode and the cathode electrode.

BRIEF DESCRIPTION OF THE DRAWINGS

The above and other objects and features of the disclosure will become apparent by describing in detail embodiments thereof with reference to the accompanying drawings.

FIG. 2 is a schematic block diagram illustrating the operation of an electronic device according to an embodiment of the disclosure.

4

Figure 15:
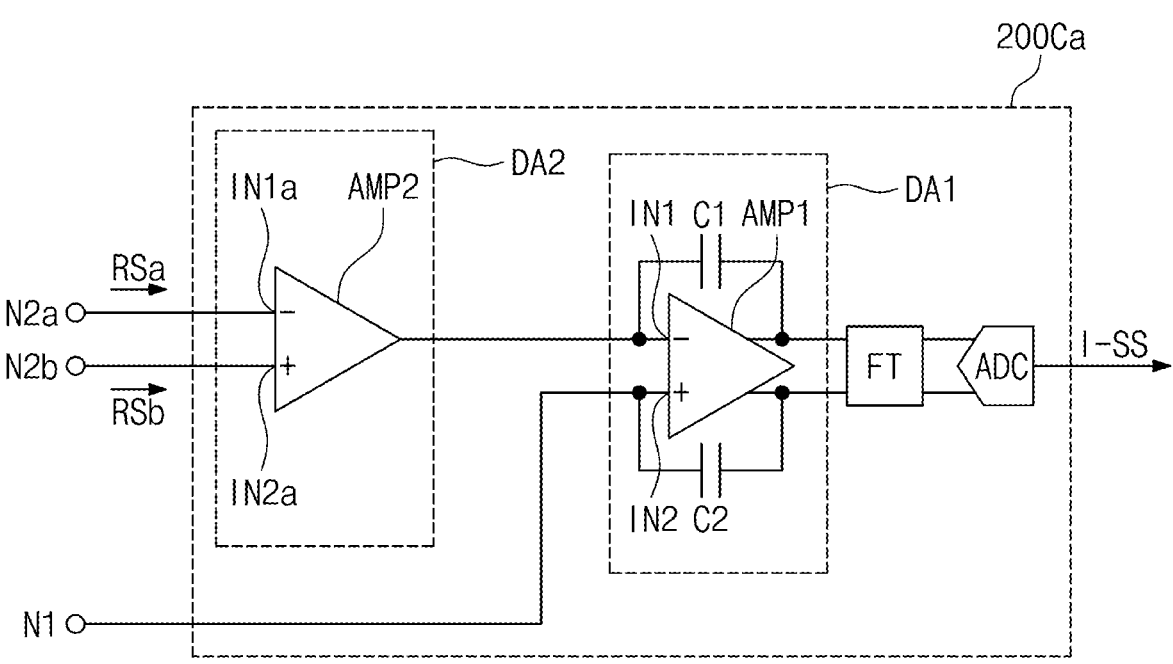

FIG. 15 is a schematic diagram of an equivalent circuit of a sensor driver according to an embodiment of the disclosure.

DETAILED DESCRIPTION OF THE EMBODIMENTS

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Also, when an element is referred to as being "in contact" or "contacted" or the like to another element, the element may be in "electrical contact" or in "physical contact" with another element; or in "indirect contact" or in "direct contact" with another element.

The same reference numeral will be assigned to the same component. In addition, in drawings, thicknesses, proportions, and dimensions of components may be exaggerated to describe the technical features effectively. The term "and/or" includes any and all combinations of one or more of associated components.

Although the terms "first", "second", etc. may be used to describe various components, the components should not be construed as being limited by the terms. The terms are only used to distinguish one component from another component. For example, without departing from the scope and spirit of the disclosure, a first component may be referred to as a second component, and similarly, the second component may be referred to as the first component. The singular forms are intended to include the plural forms unless the context clearly indicates otherwise.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

In the specification and the claims, the phrase "at least one of" is intended to include the meaning of "at least one selected from the group of" for the purpose of its meaning and interpretation. For example, "at least one of A and B" may be understood to mean "A, B, or A and B." In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

It will be further understood that the terms "comprises", "comprising", "includes", or "including", or "having" specify the presence of stated features, numbers, steps, operations, components, parts, or the combination thereof, but do not preclude the presence or addition of one or more other features, numbers, steps, operations, components, components, and/or the combination thereof.

Unless otherwise defined, all terms (including technical terms and scientific terms) used in the specification have the same meaning as commonly understood by one skilled in the art to which the disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the disclosure will be described with reference to accompanying drawings.

Figure 1:
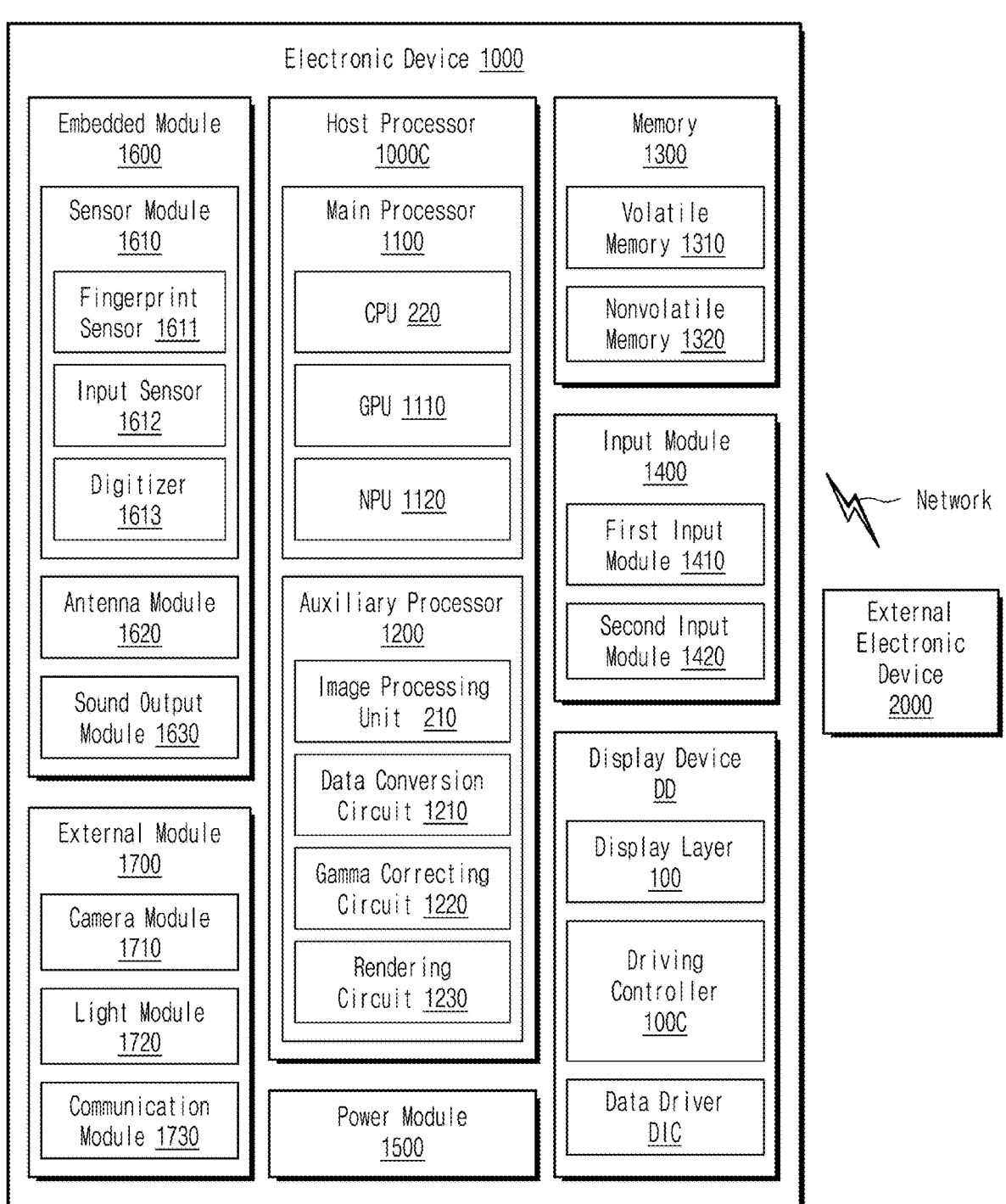
FIG. 1 is a schematic block diagram of an electronic device according to an embodiment of the disclosure.

FIG. 1 is a schematic block diagram of an electronic device according to an embodiment of the disclosure.

Referring to FIG. 1, an electronic device 1000 may output various pieces of information through a display device DD in an operating system. In case that a host processor 1000C executes an application stored in a memory 1300, the display device DD may provide the user with application information through a display layer 100.

The host processor 1000C may acquire an external input through an input module 1400 or a sensor module 1610 and execute an application corresponding to the external input. For example, in case that a user selects a camera icon displayed on the display layer 100, the host processor 1000C may acquire a user input through an input sensor 1612 and may activate a camera module 1710. The host processor 1000C may transmit, to the display device DD, frame data corresponding to an image captured through the camera module 1710. The display device DD may display an image, which corresponds to the captured image, through the display layer 100.

For example, in case that authentication for personal information is performed in the display device DD, a fingerprint sensor 1611 may acquire input fingerprint information, which is input, as input data. For example, the host processor 1000C may compare input data, which is acquired through the fingerprint sensor 1611, with authentication data stored in the memory 1300 and may execute an application depending on a comparison result. The display device DD may display information executed depending on logic of the application, through the display layer 100.

For example, in case that the user selects a music streaming icon displayed on the display device DD, the host processor 1000C may acquire a user input through the input sensor 1612 and activate a music streaming application stored in the memory 1300. In case that a music play command is input to the music streaming application, the host processor 1000C may activate a sound output module 1630 and provide the user with sound information corresponding to the music play command.

The above description has been made regarding the operation of the electronic device 1000 in brief. Hereinafter, components of the electronic device 1000 will be described in detail. Some components of the electronic device 1000 described below may be integrated with each other and may be provided in the form of one component, or one component of the electronic device 1000 may be separated into two components.

The electronic device 1000 may communicate with an external electronic device 2000 through a network (e.g., a short-range wireless communication network, or a long-range wireless communication network). According to an embodiment, the electronic device 1000 may include the host processor 1000C, the memory 1300, an input module 1400, the display device DD, a power supply module 1500, an embedded module 1600, and an external module 1700. According to an embodiment, the electronic device 1000 may be configured such that at least one of the above-described components is omitted or other components are additionally included. According to an embodiment, some (e.g., a sensor module 1610, an antenna module 1620, or the sound output module 1630) of the above-described components may be integrated with another component (e.g., the display device DD).

The host processor 1000C may execute software to control at least one other component (e.g., hardware or software component) of the electronic device 1000 connected with the host processor 1000C and may perform various data processing operations and computation operations. According to an embodiment, as at least a part of the data processing or computation operations, the host processor 1000C may store a command or data received from another component (e.g., the input module 1400, the sensor module 1610, or a communication module 1730) in a volatile memory 1310, may process the command or data stored in the volatile memory 1310, and may store the result data in a nonvolatile memory 1320.

According to an embodiment, the host processor 1000C may include a main processor 1100 and an auxiliary processor 1200. The main processor 1100 (MCU) may include at least one of a central processing unit (CPU) 220 and an application processor (AP). The main processor 1100 may further include at least one of a graphic processing unit (GPU) 1110, a communication processor (CP), and an image signal processor (ISP). The main processor 1100 may further include a neural processing unit (NPU) 1120. The neural processing unit 1120 may be a processor specialized for processing of an artificial intelligence (AI) model, and the AI model may be created through machine learning. The AI model may include multiple artificial neural network (ANN) layers. The ANN may include a deep neural network (DNN), a convolutional neural network (CNN), a recurrent neural network (RNN), a restricted boltzman machine (RBM), a deep belief network (DBN), a bidirectional recurrent deep neural network (BRDNN), a deep Q-networks or a combination of the above networks, but the disclosure is not limited thereto. The AI model may additionally or alternatively include a software structure, in addition to a hardware structure. At least two of the above processing units and processors may be integrally implemented in the form of one integral-type component (e.g., a single chip), or each of the above processing units and processors may be implemented in the form of an individual component (e.g., multiple chips).

The auxiliary processor 1200 may include an image processing unit 210, a data conversion circuit 1210, a gamma correcting circuit 1220, and a rendering circuit 1230.

The image processing unit 210 may output image data by converting a data format of image data.

The data conversion circuit 1210 may receive frame data from a driving controller 100C, compensate the frame data such that an image is displayed with a desired brightness depending on a characteristic of the electronic device 1000 or user settings, or may convert the frame data to reduce power consumption or to compensate afterimages. The gamma correcting circuit 1220 may convert the frame data or the gamma reference voltage such that an image displayed on the electronic device 1000 has a desired gamma characteristic. The rendering circuit 1230 may receive the frame data from the driving controller 100C, and may perform rendering the frame data, based on the pixel arrangement of the display layer 100 applied to the electronic device 1000. At least one of the data conversion circuit 1210, the gamma correcting circuit 1220, and the rendering circuit 1230 may be integrated with another component (e.g., the main processor 1100 or the driving controller 100C). At least one of the data conversion circuit 1210, the gamma correcting circuit 1220, and the rendering circuit 1230 may be integrated into a data driver DIC described below.

The memory 1300 may store various data used by at least one component (e.g., the host processor 1000C or the sensor module 1610) of the electronic device 1000 and input data or output data for commands related to the various data. The memory 1300 may include, for example, at least one of a volatile memory 1310 and a nonvolatile memory 1320.

The input module 1400 may receive commands or data which will be used by a component (e.g., the host processor 1000C, the sensor module 1610, or the sound output module 1630) of the electronic device 1000, from the outside (e.g., a user or an external electronic device 2000) of the electronic device 1000.

The input module 1400 may include a first input module 1410 to receive a command or data from the user and a second input module 1420 to receive a command or data from the external electronic device 2000. The first input module 1410 may include a microphone, a mouse, a keyboard (e.g., a button), or a pen (e.g., a passive pen or an active pen). The second input module 1420 may support a protocol which may be connected to the external electronic device 2000 in a wireless method or a wired method. According to an embodiment, the second input module 1420 may include at least one of a high definition multimedia interface (HDMI), a universal serial bus (USB) interface, an SD card interface, and an audio interface. The second input module 1420 may include a connector to be physically connected to the external electronic device 2000, for example, an HDMI connector, a USB connector, an SD card connector, and an audio connector (e.g., a headphone connector).

The display device DD may visually provide information to the user. The display device DD may include the display layer 100, the driving controller 100C, and the data driver DIC. The display device DD may further include a window, a chassis, and a bracket to protect the display layer 100. The display device DD may further include an emission driving circuit and a voltage generator. The details of the display device DD will be described below.

The power module 1500 may supply power to the component of the electronic device 1000. The power module 1500 may include a battery to charge a power supply. The battery may include a primary battery, which is not rechargeable, a secondary battery which is rechargeable, or a fuel cell. The power module 1500 may include a power management integrated circuit (PMIC). The PMIC may supply power optimized for a module described above and a module described below. The PMIC may supply power optimized for the above-described component and a component described below. The power module 1500 may include a wireless power transmit/receive member electrically connected to the battery. The wireless power transmit/receive member may include multiple antenna radiators having a form of a coil.

The electronic device 1000 may further include the embedded module 1600 and an external module 1700. The embedded module 1600 may include a sensor module 1610, the antenna module 1620, and the sound output module 1630. The external module 1700 may include the camera module 1710, a light module 1720, and the communication module 1730.

The sensor module 1610 may sense an input made by a physical body of a user or by a pen of the first input module 1410, and generate an electrical signal or a data value corresponding to the input. The sensor module 1610 may include at least one of the fingerprint sensor 1611, the input sensor 1612, and a digitizer 1613.

The fingerprint sensor 1611 may generate a data value corresponding to the fingerprint of a user. The fingerprint sensor 1611 may include at least one of fingerprint sensor in an ultrasonic-wave scheme, an optical scheme, and a capacitive scheme.

The input sensor 1612 may generate a data value corresponding to coordinate information of the input made by the physical body of the user, or the input made by the user. The input sensor 1612 may generate the variation of capacitance, which is made by the input, in a form of a data value. The input sensor 1612 may sense the input made by the passive pen, and may transmit or receive data with the active pen.

The input sensor 1612 may measure a biometrics signal such as blood pressure, moisture, or body fat. For example, in case that the user makes contact with a sensor layer or a sensing panel through a part of a physical body without movement for a specific time, the input sensor 1612 may sense a biometric signal based on the change in an electric field made by the part of the physical body and output information, which is desired by the user, to the display device DD.

The digitizer 1613 may generate a data value corresponding to coordinate information of the input made by the pen. The digitizer 1613 may generate a data based on a change of the electric field made by the input. The digitizer 1613 may sense the input made by the passive pen, and transmit or receive data with the active pen.

At least one of the fingerprint sensor 1611, the input sensor 1612, and the digitizer 1613 may be implemented in a form of a sensor layer formed on the display layer 100 through subsequent processes. The fingerprint sensor 1611, the input sensor 1612, and the digitizer 1613 may be arranged at an upper portion of the display layer 100, or at least one (e.g., the digitizer 1613) of the fingerprint sensor 1611, the input sensor 1612, and the digitizer 1613 may be disposed at a lower portion of the display layer 100.

At least two of the fingerprint sensor 1611, the input sensor 1612, and the digitizer 1613 may be integrated into one sensing panel through a same process. In case that at least two of the fingerprint sensor 1611, the input sensor 1612, and the digitizer 1613 is integrated into the one sensing panel, the sensing panel may be interposed between the display layer 100 and a window disposed at the upper portion of the display layer 100. According to an embodiment, the sensing panel may be disposed on the window, but the position of the sensing panel is not limited thereto specifically.

At least one of the fingerprint sensor 1611, the input sensor 1612, and the digitizer 1613 may be implemented into the display layer 100. In other words, at least one of the fingerprint sensor 1611, the input sensor 1612, and the digitizer 1613 may be simultaneously formed through a process for forming the elements (e.g., the emission element and the transistor) included in the display layer 100.

The sensor module 1610 may generate an electrical signal or a data value corresponding to an internal state or an external state of the electronic device 1000. For example, the sensor module 1610 may further include a gesture sensor, a gyro sensor, an atmospheric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The antenna module 1620 may include at least one antenna to transmit a signal or power to the outside or to receive a signal or power from the outside. According to an embodiment, the communication module 1730 may transmit a signal, which is appropriate to a communication method, to the external electronic device 2000 or to receive a signal from the external electronic device 2000. The antenna pattern of the antenna module 1620 may be integrated in a form of one component (e.g., the display layer 100 or the input sensor 1612) of the display device DD.

The sound output module 1630, which is a device to output the sound signal out of the electronic device 1000, may include a speaker used for a general purpose, such as reproducing multimedia or a record, and a receiver dedicated to receive a telecommunication. According to an embodiment, the receiver may be formed integrally with the speaker or separately from the speaker. The sound output pattern of the sound output module 1630 may be integrated with the display device DD.

The camera module 1710 may capture a still image and a moving image. According to an embodiment, the camera module 1710 may include at least one lens, an image sensor, or an image signal processor. The camera module 1710 may further include an infrared camera to measure the presence of a user, the position of the user, or the gaze of the user.

The light module 1720 may provide light. The light module 1720 may include a light emitting diode or a xenon lamp. The light module 1720 may operate in link to the camera module 1710 or independently from the camera module 1710.

The communication module 1730 may establish a wired or wireless communication channel between the electronic device 1000 and the external device 2000 and support communication through the established wired or wireless communication channel. The communication module 1730 may include at least one of a wireless communication module, such as a cellular communication module, a short-range wireless communication module, or a global navigation satellite system (GNSS) communication module, and a wired communication module such as a local area network (LAN) communication module, a power line communication module. The communication module 1730 may communicate with the external electronic device 2000 through a short-range communication network such as Bluetooth, Wi-Fi direct or infrared data association (IrDA), or a long-distance communication network such as a cellular network, the Internet, or a computer network (e.g., a LAN or WAN). The above-described types of communication modules 1730 may be implemented in a form of a single chip or individual chips.

The input module 1400, the sensor module 1610, and the camera module 1710 may link to the host processor 1000C to control the operation of the display device DD.

The host processor 1000C may output commands or data to the display device DD, the sound output module 1630, the camera module 1710, or the light module 1720 based on the input data received from the input module 1400. For example, the host processor 1000C may generate frame data corresponding to the input data applied from the mouse or the active pen and may output the frame data to the display device DD, or may generate command data corresponding to the input data and may outputs the input data and the command data to the camera module 1710 or the light module 1720. In case that input data are not received from the input module 1400 during a specific period of time, the host processor 1000C may switch an operating mode of the electronic device 1000 to a low-power mode or a sleep mode such that the power consumption of the electronic device 1000 is reduced.

The host processor 1000C may output commands or data to the display device DD, the sound output module 1630, the camera module 1710, or the light module 1720 based on the sensing data received from the sensing module 1610. For example, the host processor 1000C may compare input data acquired by the fingerprint sensor 1611 with authentication data stored in the memory 1300 and may execute an application depending on a comparison result. The host processor 1000C may execute a command based on the sensing data sensed by the input sensor 1612 or the digitizer 1613 or may output frame data corresponding to the sensing data to the display device DD. In case that the sensor module 1610 includes a temperature sensor, the host processor 1000C may receive temperature data associated with the measured temperature from the sensor module 1610 and may further perform brightness correction on the image data based on the temperature data.

The host processor 1000C may receive measurement data about the presence of the user, the position of the user, and the gaze of the user from the camera module 1710. The host processor 1000C may additionally execute the correction of the brightness for the frame data based on the measurement data. For example, the host processor 1000C that determines the presence of the user through the input from the camera module 1710 may display frame data corrected in brightness through the data conversion circuit 1210 or the gamma correction circuit 1220.

At least some of the components may be connected to each other through a communication member (e.g., a bus, a general purpose input and output (GPIO), a serial peripheral interface (SPI), a mobile industry processor interface (MIPI) or an ultra-path interconnect (UPI) link) between peripheral devices and may exchange signals (e.g., commands or data) with each other. The host processor 1000C may communicate with the display device DD through an interface. For example, one of the communication member described above may be used, but the disclosure is not limited thereto.

The electronic device 1000 may be provided in various types. The electronic device 1000 may be at least one of, for example, a portable communication device (e.g., a smartphone), a computer device, a portable multimedia device, a mobile medical appliance, a camera, a wearable device, and a home appliance. However, the electronic device is not limited to the above-described electronic devices.

Figure 2:
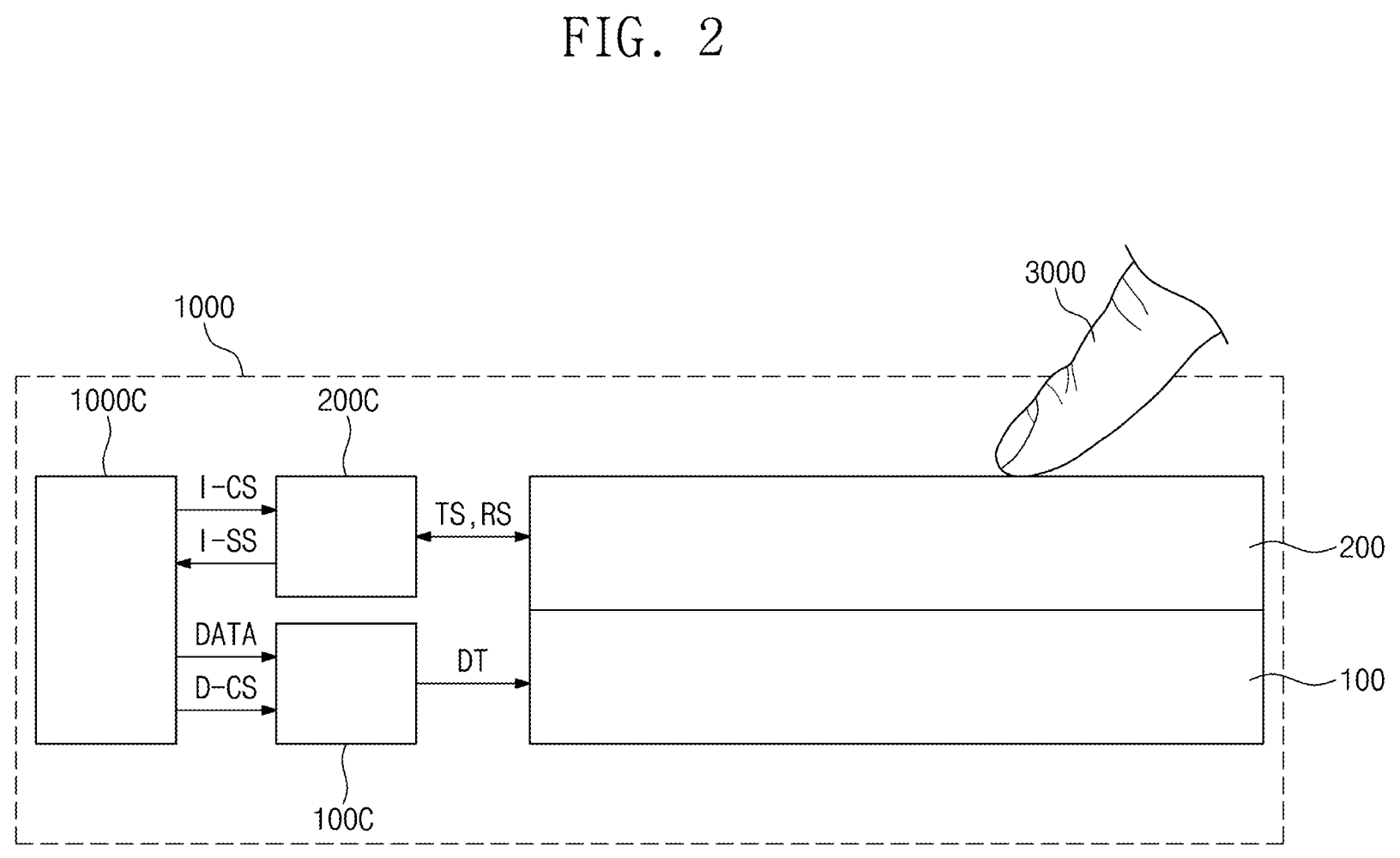

FIG. 2 is a schematic block diagram illustrating the operation of an electronic device according to an embodiment of the disclosure.

Referring to FIG. 2, the electronic device 1000 may include a display layer 100, a sensor layer 200, a driving controller 100C, a sensor driver 200C, and a host processor 1000C.

The display layer 100 may be a component which substantially generates an image and displays the image. The display layer 100 may be an emission display layer. For example, the display layer 100 may be an organic emission display layer, a quantum dot display layer, a micro-LED display layer, or a nano-LED display layer. The display layer 100 may be a display panel.

The sensor layer 200 may be disposed on the display layer 100. The sensor layer 200 may sense an external input 3000 applied from an outside. The external input 3000 may include input units to provide a change in capacitance. For example, the sensor layer 200 may sense an input made by an active-type input unit to provide a transmit signal, as well as a passive-type input unit, such as a human body, of a user. The sensor layer 200 may be a sensor, a touch layer, a touch panel, an input sensing layer, or an input sensing panel.

The host processor 1000C may control the overall operation of the electronic device 1000. For example, the host processor 1000C may control the operation of the driving controller 100C and the sensor driver 200C. The host processor 1000C may include at least one micro-processor.

The driving controller 100C may drive the display layer 100. The driving controller 100C may receive a data signal DATA and a control signal D-CS from the host processor 1000C. The data signal DATA may be an MIPI signal. The control signal D-CS may include various signals. For example, the control signal D-CS may include an input vertical synchronization signal, an input horizontal synchronization signal, a main clock, and a data enable signal. The driving controller 100C may generate a scan control signal and a data control signal for controlling the driving of the display layer 100, in response to the control signal D-CS.

The driving controller 100C may generate image data DT formed by transforming the format of the data signal DATA to be matched with the interface specification of the display layer 100.

The sensor driver 200C may drive the sensor layer 200. The sensor driver 200C may receive a control signal I-CS from the host processor 1000C. The control signal I-CS may include a clock signal of the sensor layer 200.

The sensor driver 200C may output a transmit signal TS to the sensor layer 200. The sensor driver 200C may calculate information on coordinates of an input, based on a receive signal RS received from the sensor layer 200, and may provide a coordinate signal I-SS having the coordinate information to the host processor 1000C. The host processor 1000C may execute an operation corresponding to a user input, in response to the coordinate signal I-SS. For example, the host processor 1000C may operate the driving controller 100C such that a new application image is displayed on the display layer 100.

Figure 3:
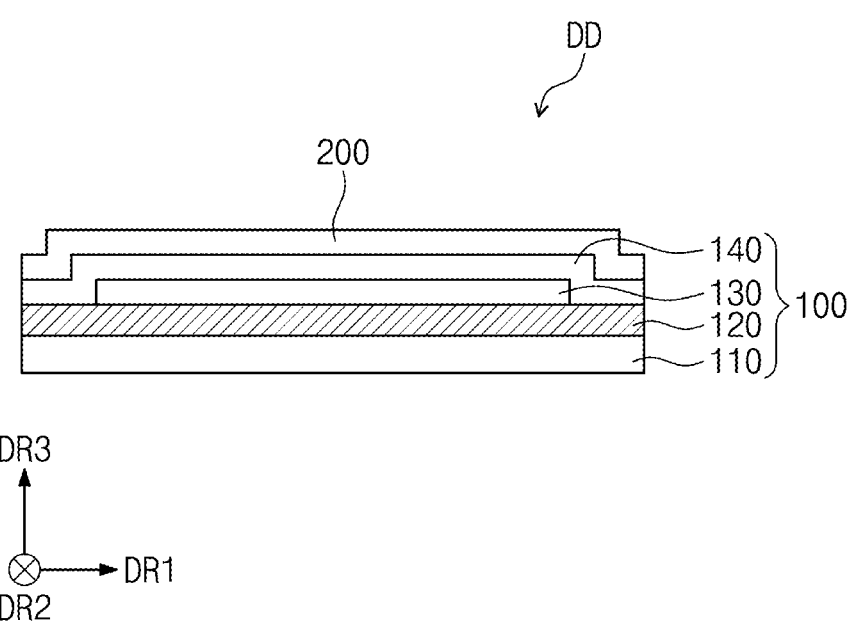
FIG. 3 is a schematic cross-sectional view of a display device according to an embodiment of the disclosure.

FIG. 3 is a schematic cross-sectional view of a display device according to an embodiment of the disclosure.

Referring to FIG. 3, the display device DD may include the display layer 100 and the sensor layer 200.

The display layer 100 may include a base layer 110, a circuit layer 120, an emission element layer 130, and an encapsulating layer 140.

The base layer 110 may be a member which provides a base surface for disposing the circuit layer 120. The base layer 110 may be a glass substrate, a metal substrate, or a polymer substrate. However, the disclosure is not limited thereto, and the base layer 110 may be an inorganic layer, an organic layer, or a composite material layer.

The base layer 110 may have a multi-layer structure. For example, the base layer 110 may include a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be referred to as a "base barrier layer".

Each of the first and second synthetic resin layers may include a polyimide-based resin. In another embodiment, each of the first and second synthetic resin layers may include at least one of an acrylate-based resin, a methacrylate-based resin, a polyisoprene-based resin, a vinyl-based resin, an epoxy-based resin, an urethane-based resin, a cellulose-based resin, a siloxane-based resin, a polyamide-based resin, and a perylene-based resin. In the specification, the term "~~based resin" may refer to that "~~based resin" includes a functional group of "~~", with "~~" being one of the previously-referred to acrylates, methacrylates, polyisoprenes, vinyls, epoxies, urethanes, cellulose, siloxanes, polyamides, or perylenes.

The circuit layer 120 may be disposed on the display layer 110. The circuit layer 120 may include an insulating layer, a semiconductor pattern, a conductive pattern, and a signal line. An insulating layer, a semiconductor layer, and a conductive layer may be formed on the base layer 110 through a coating or deposition process. Thereafter, the insulating layer, the semiconductor layer, and the conductive layer may be selectively patterned through multiple photolithography processes. Thereafter, the semiconductor pattern, the conductive pattern, and the signal line included in the circuit layer 120 may be formed.

The emission element layer 130 may be disposed on the circuit layer 120. The emission element layer 130 may include an emission element. For example, the emission element layer 130 may include an organic emission material, a quantum dot, a quantum rod, a micro-LED, or a nano-LED.

The encapsulating layer 140 may be disposed on the emission element layer 130. The encapsulating layer 140 may protect the emission element layer 130 from foreign substances such as moisture, oxygen, and dust particles.

The sensor layer 200 may be disposed on the display layer 100. The sensor layer 200 may sense an external input applied from an outside. The external input may be a user input. The user input may include various external inputs, such as inputs made by a part of a physical body of the user, light, heat, a pen, pressure, or a combination thereof.

The sensor layer 200 may be formed on the display layer 100 through a successive process. In an embodiment, the sensor layer 200 may be directly disposed on the display layer 100. The term "~being directly disposed~" may indicate that a third component is not intervened between the sensor layer 200 and the display layer 100. In other words, an additional adhesive member may not be interposed between the sensor layer 200 and the display layer 100. In another embodiment, the sensor layer 200 may be bonded to the display layer 100 through an adhesive member. The adhesive member may include a typical adhesive or a sticking agent.

Although not illustrated, the display device DD may further include an anti-reflective layer and an optical layer disposed on the sensor layer 200. The anti-reflective layer may reduce reflectance of external light incident from the outside of the display device DD. The optical layer may improve the front brightness of the display device 1000 by controlling a direction of light incident to the display layer 100.

Figure 4:
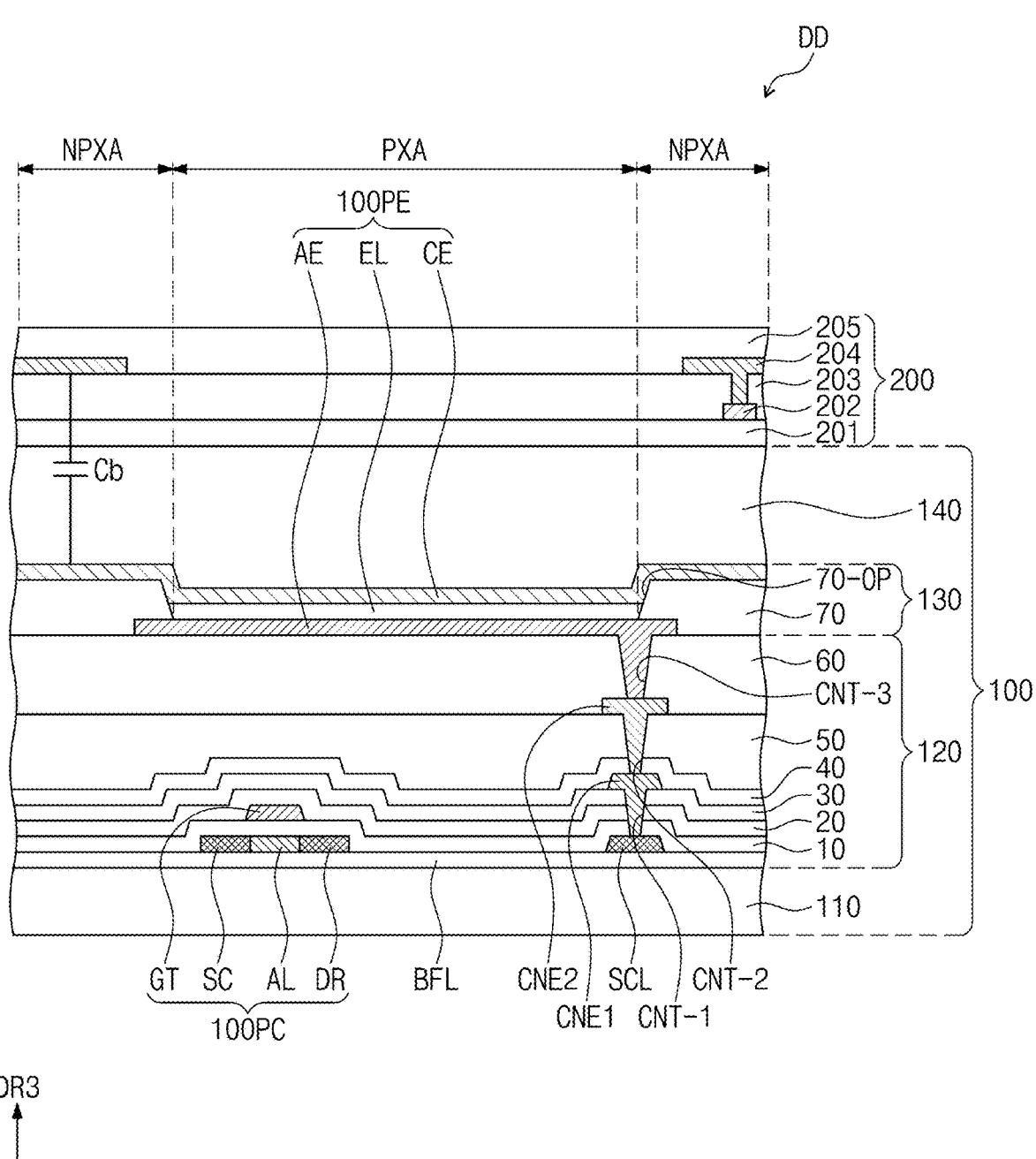
FIG. 4 is a schematic cross-sectional view of a display device according to an embodiment of the disclosure.

FIG. 4 is a schematic cross-sectional view of a display device according to an embodiment of the disclosure.

Referring to FIG. 4, at least one inorganic layer may be formed on a top surface of the base layer 110. The inorganic layer may include at least one of aluminum oxide, titanium oxide, silicon oxide, silicon nitride, silicon oxynitride, zirconium oxide, and hafnium oxide. The inorganic layer may be formed in multi-layers. Multiple inorganic layers may constitute a barrier layer and/or a buffer layer. According to an embodiment, the display layer 100 may include a buffer layer BFL.

The buffer layer BFL may improve bonding force between the base layer 110 and a semiconductor pattern. The buffer layer BFL may include at least one of silicon oxide, silicon nitride, and silicon oxynitride. For example, the buffer layer BFL may include a structure in which a silicon oxide layer and a silicon nitride layer are alternately stacked each other.

The semiconductor pattern may be disposed on the buffer layer BFL. The semiconductor pattern may include polysilicon. However, the disclosure is not limited thereto, and the semiconductor pattern may include amorphous silicon, low-temperature polycrystalline silicon, or an oxide semiconductor.

FIG. 4 schematically illustrates only a portion of the semiconductor pattern, and the semiconductor pattern may be further disposed in another region. Semiconductor patterns may be arranged in a specific pattern across pixels. The semiconductor patterns may have an electrical property depending on a doping condition. The semiconductor patterns may include a first region having higher conductivity and a second region having lower conductivity. The first region may be doped with N-type dopants or P-type dopants. A P-type transistor may include a doping region doped with the P-type dopant, and an N-type transistor may include a doping region doped with the N-type dopant. The second region may be a non-doping region or may be a region doped at a concentration lower than the concentration of the first region.

The conductivity of the first region may be higher than the conductivity of the second region. The first region may substantially serve as an electrode or a signal line. The second region may correspond to an active region (or channel) of a transistor. In other words, a portion of the semiconductor pattern may be an active region of a transistor, another portion of the semiconductor pattern may be a source region or a drain region of the transistor, and still another portion of the semiconductor pattern may be a connection electrode or a connection signal line.

Each of pixels may have a circuit including seven transistors, one capacitor, and an emission element 1000PE, but the disclosure is not limited thereto, and the circuit of the pixel may be modified in various forms. FIG. 4 illustrates that the pixel includes one transistor 100PC and one emission element 100PE, according to an embodiment.

A source region SC, an active region AL, and a drain region DR of the transistor 100PC may be formed from the semiconductor pattern. The source region SC and the drain region DR may extend from the active AL in directions opposite to each other, in a cross-sectional view. A portion of a connection signal line SCL formed from the semiconductor pattern is illustrated in FIG. 4. Although not separately illustrated, the connection signal line SCL may be connected with a drain region DR of the transistor 100PC, in a plan view.

A first insulating layer 10 may be disposed on the buffer layer BFL. The first insulating layer 10 may be commonly provided in multiple pixels and cover the semiconductor pattern. The first insulating layer 10 may be an inorganic layer and/or an organic layer, and may have a single-layer or multi-layer structure. The first insulating layer 10 may include at least one of an aluminum oxide, a titanium oxide, a silicon oxide, a silicon nitride, a silicon oxynitride, a zirconium oxide, and a hafnium oxide. According to an embodiment, the first insulating layer 10 may be a silicon oxide layer having a single-layer structure. The first insulating layer 10 and an insulating layer of the circuit layer 120, which is described below, may be an inorganic layer and/or an organic layer, and may have a single-layer structure or a multi-layer structure. The inorganic layer may include, but is not limited to, at least one of the above-described materials.

A gate GT of the transistor 100PC may be disposed on the first insulating layer 10. The gate GT may be a portion of a metal pattern. The gate GT may overlap the active region AL in a plan view. The gate GT may serve as a mask in the process of doping the semiconductor pattern.

A second insulating layer 20 may be disposed on the first insulating layer 10 and cover the gate GT. The second insulating layer 20 may be commonly disposed over the pixels. The second insulating layer 20 may be an inorganic layer and/or an organic layer, and may have a single-layer or multi-layer structure. The second insulating layer 20 may include at least one of silicon oxide, silicon nitride, and silicon oxynitride. According to an embodiment, the second insulating layer 20 may have a multi-layer structure including a silicon oxide layer and a silicon nitride layer.

A third insulating layer 30 may be disposed on the second insulating layer 20. The third insulating layer 30 may have a single layer structure or a multi-layer structure. According to an embodiment, the third insulating layer 30 may have a multi-layer structure including a silicon oxide layer and a silicon nitride layer.

A first connection electrode CNE1 may be disposed on the third insulating layer 30. The first connection electrode CNE1 may be connected to the connection signal line SCL through a contact hole CNT-1 formed through the first insulating layer 10, the second insulating layer 20, and the third insulating layer 30.

The fourth insulating layer 40 may be disposed on the third insulating layer 30. According to an embodiment, the fourth insulating layer 40 may be a silicon oxide layer in a single layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 formed through the fourth insulating layer 40, and the fifth insulating layer 50.

A sixth insulating layer 60 may be disposed on the fifth insulating layer 50 and may cover the second connection electrode CNE2. The sixth insulating layer 60 may be an organic layer.

The emission element layer 130 may be disposed on the circuit layer 120. The emission element layer 130 may include an emission element 100PE. For example, the emission element layer 130 may include an organic emission material, a quantum dot, a quantum rod, a micro-LED, or a nano-LED. The following description will be described based on the emission element 100PE including an organic emission element according to an embodiment, but the disclosure is not specifically limited thereto.

The emission element 100PE may include an anode electrode AE, an emission layer EL, and a cathode electrode CE.

The anode electrode AE may be disposed on the sixth insulating layer 60. The anode electrode AE may be connected with the second connection electrode CNE2 through a contact hole CNT-3 formed through the sixth insulating layer 60.

A pixel defining layer 70 may be disposed on the sixth insulating layer 60 and may cover a portion of the anode electrode AE. An opening 70-OP may be defined in the pixel defining layer 70. The opening 70-OP of the pixel defining layer 70 may expose at least a portion of the first electrode AE.

The display device DD may include an emission region PXA and a non-emission region NPXA adjacent to the emission region PXA. The non-emission region NPXA may surround the emission region PXA. According to an embodiment, the emission region PXA may correspond to the portion of the anode electrode AE, which is exposed by the opening 70-OP.

The emission layer EL may be disposed on the anode electrode AE. The emission layer EL may be disposed in a region corresponding to the opening 70-OP. In other words, the emission layer EL may be separately formed in each of pixels. In case that the emission layer EL is separately formed in each pixel, each of the emission layers EL may emit light of at least one of a blue color, a red color, and a green color. However, the disclosure is not limited thereto. In another embodiment, the emission layer EL may be connected with the pixels and commonly provided in the pixels, and the emission layer EL may provide blue light or white light.

The cathode electrode CE may be disposed on the emission layer EL. The cathode electrode CE may have an integral-type form, and may be commonly disposed in the pixels.

Although not illustrated, a hole control layer may be disposed between the anode electrode AE and the emission layer EL. The hole control layer may be disposed in the emission region PXA and the non-emission region NPXA in common. The hole control layer may further include a hole transfer layer and a hole injection layer. Although not illustrated, an electron control layer may be interposed between the emission layer EL and the cathode electrode CE. The electron control layer may include an electron transfer layer and may further include an electron injection layer. The hole control layer and the electron control layer may be commonly formed in the pixels by using an open mask.

The encapsulating layer 140 may be disposed on the emission element layer 130. The encapsulating layer 140 may include an inorganic layer, an organic layer, and an inorganic layer sequentially stacked, but layers constituting the encapsulation layer 140 are not limited thereto.

The inorganic layers may protect the emission element layer 130 from moisture and oxygen, and the organic layer may protect the emission element layer 130 from a foreign material such as dust particles. The inorganic layers may include a silicon nitride layer, a silicon oxynitride layer, a silicon oxide layer, a titanium oxide layer, or an aluminum oxide layer. The organic layer may include an acrylic-based organic layer, but the disclosure is not limited thereto.

The sensor layer 200 may include a base layer 201, a first conductive layer 202, a sensing insulating layer 203, a second conductive layer 204, and a cover insulating layer 205.

The base layer 201 may be an inorganic layer including at least one of silicon nitride, silicon oxynitride, and silicon oxide. In another embodiment, the base layer 201 may be an organic layer including an epoxy resin, an acrylic resin, or an imide-based resin. The base layer 201 may have a single layer structure or a multi-layer structure including layers stacked in the third direction DR3.

Each of the first conductive layer 202 and the second conductive layer 204 may have a single layer structure or a multi-layer structure including the layers stacked in the third direction DR3.

The conductive layer having the single layer structure may include a metal layer or a transparent conductive layer. The metal layer may include molybdenum, silver, titanium, copper, aluminum, or an alloy thereof. The transparent conductive layer may include transparent conductive oxide such as indium tin oxide (ITO), indium zinc oxide (IZO), zinc oxide (ZnO), or indium zinc tin oxide (IZTO). In another embodiment, the transparent conductive layer may include conductive polymer, such as PEDOT, a metal nanowire, or graphene.

The conductive layer in the multi-layer structure may include metal layers. The metal layers may have, for example, a three-layer structure of titanium/aluminum/titanium. The conductive layer in the multi-layer structure may include at least one metal layer and at least one transparent conductive layer.

At least one of the sensing insulating layer 203 and the cover insulating layer 205 may include an inorganic layer. The inorganic layer may include at least one of an aluminum oxide, a titanium oxide, a silicon oxide, a silicon nitride, a silicon oxynitride, a zirconium oxide, and a hafnium oxide.

At least one of the sensing insulating layer 203 and the cover insulating layer 205 may include an organic layer. The organic layer may include at least one of an acrylate-based resin, a methacrylate-based resin, polyisoprene, a vinyl-based resin, an epoxy-based resin, an urethane-based resin, a cellulose-based resin, a siloxane-based resin, a polyimide-based resin, a polyamide-based resin, and a perylene-based resin.

A parasitic capacitor Cb may be formed between the sensor layer 200 and the cathode electrode CE. The parasitic capacitor Cb may be referred to as a base capacitance. As a distance between the sensor layer 200 and the cathode electrode CE decreases, the capacitance of the parasitic capacitor Cb may increase. As the capacitance of the parasitic capacitor Cb increases, the ratio of a variation in capacitance to a reference value may decrease. The variation in capacitance may be a change in a capacitance that is caused before and after an input made by the physical body 3000 of the user (see FIG. 2)

The sensing driving circuit 200C (see FIG. 2) for processing a signal sensed from the sensor layer 200 may perform a leveling operation of removing a value, which corresponds to the capacitance of the parasitic capacitor Cb, from the sensed signal. The ratio of the variation in capacitance to the reference value may be increased by the leveling operation, and thus, the sensitivity of sensing may be improved.

Figure 5:
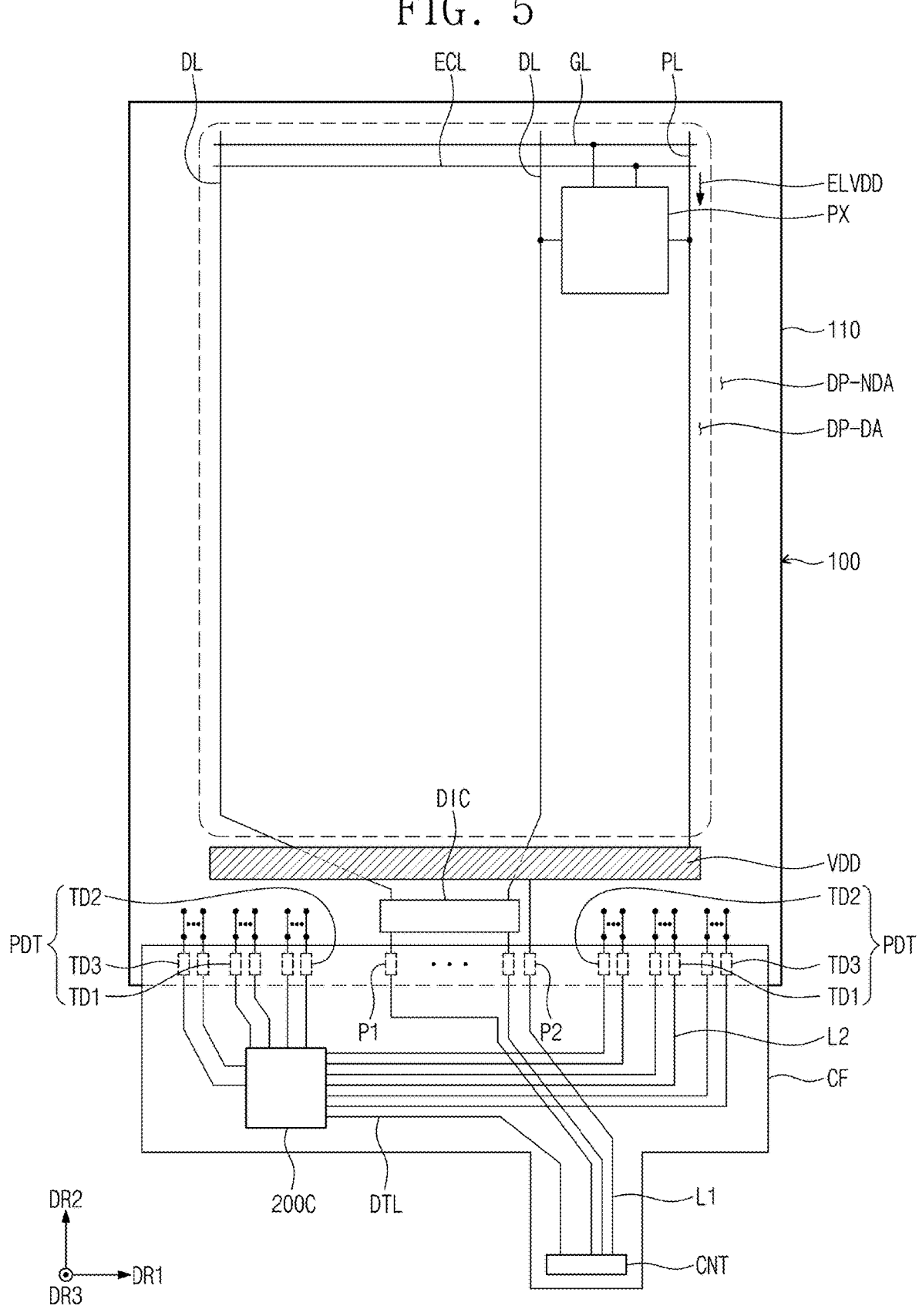
FIG. 5 is a plan view of a display layer, a flexible substrate, and a sensor driver according to an embodiment of the disclosure.

FIG. 5 is a plan view of a display layer, a flexible substrate, and a sensor driver according to an embodiment of the disclosure.

Referring to FIGS. 2 and 5, the display device DD may include the display layer 100, a power supply pattern VDD, a data driver DIC, a flexible substrate CF, a sensor driver 200C, a display signal line L1, a sensor signal line L2, a first communication line DTL, and a connector CNT.

A display region DP-DA and a peripheral region DP-NDA adjacent to the display region DP-DA may be defined at the display layer 100. The display region DP-DA may be a region for displaying an image. The pixels PX may be disposed in the display region DP-DA. The peripheral region DP-NDA may be a region for a driving circuit, or a driving wiring.

The display layer 100 may include the base layer 110, the pixels PX, the signal lines GL, DL, PL, and ECL, the display pads P1 and P2, and the sensing pads PDT.

Each of the pixels PX may display one of a primary color and one of a mixed color. The primary color may include red, green, or blue. The mixed color may include various colors such as white, yellow, cyan, or magenta. However, the color displayed by each of the pixels PX is not limited thereto.

The signal lines GL, DL, PL, and ECL may be disposed on the base layer 110. The signal lines GL, DL, PL, and ECL may be connected to the pixels PX to transmit an electrical signal to the pixels PX. The signal lines GL, DL, PL, and ECL may include the scan lines GL, the data lines DL, the power lines PL, and the emission control lines ECL. However, configurations of the signal lines GL, DL, PL, and EL are not limited thereto. For example, the signal lines GL, DL, PL, and ECL according to an embodiment of the disclosure may further include an initialization voltage line.

A power supply pattern VDD may be disposed in the peripheral region DP-NDA. The power supply pattern VDD may be connected to multiple power lines PL. Each of the pixels PX may receive a first power voltage ELVDD provided through the power line PL.

Multiple display pads P1 and P2 may be disposed in the peripheral region DP-NDA. The display pads P1 and P2 may include a first pad P1 and a second pad P2. Multiple first pads P1 may be provided. The first pads P1 may be connected to the data lines DL, respectively. The second pad P2 may be connected to the power supply pattern VDD to be electrically connected to the power lines PL. The display panel DP may provide electrical signals, which are provided from the outside through the display pads P1 and P2, to the pixels PX. In an embodiment, the display pads P1 and P2 may further include pads to receive another electrical signal in addition to the first pad P1 and the second pad P2, and are not limited to any one embodiment.

The data driver DIC may be mounted in the peripheral region DP-NDA. The data driver DIC may be a timing control circuit provided in a form of a chip. The data driver DIC may output a gray level voltage to the data lines DL in response to frame data of the image data DT. The data lines DL may be electrically connected to the first pads P1 via the data driver DIC, respectively. However, the disclosure is not limited thereto, and the data driver DIC according to another embodiment of the disclosure may be mounted on a film separated from the display layer 100. The data driver DIC may be electrically connected to the display pads P1 and P2 through the film. For example, the film may be a flexible substrate CF.

The sensing pads PDT may be disposed in the peripheral region DP-NDA. The sensing pads PDT may be electrically connected to the sensing electrodes of the sensor layer 200, respectively. The sensing pads PDT may include multiple first sensing pads TD1, multiple second sensing pads TD2, and multiple third sensing pads TD3.

The flexible substrate CF may be electrically connected to the display pads P1 and P2 and the sensing pads PDT.

The sensor driver 200C may be mounted on the flexible substrate CF. The sensor driver 200C may be electrically connected to the sensing pads PDT.

A connector CNT may electrically connect the host processor 1000C to the display layer 100. The connector CNT may be disposed on the flexible substrate CF.

The display signal line L1 may be electrically connected between the display layer 100 and the host processor 1000C. For example, the display signal line L1 may be connected between the display pads P1 and P2 and the connector CNT. The display signal line L1 may transmit and receive the data signal DATA. The display signal line L1 may be disposed on the flexible substrate CF.

The sensor signal line L2 may be electrically connected between the sensor layer 200 and the sensor driver 200C. For example, the sensor signal line L2 may be connected between the sensing pads PDT and the sensor driver 200C. The sensor signal line L2 may transmit and receive a transmit signal TS (see FIG. 2) and a receive signal RS (see FIG. 2). The sensor signal line L2 may be disposed on the flexible substrate CF.

The first communication line DTL may be electrically connected between the sensor driver 200C and the connector CNT. The first communication line DTL may transmit driving information of the sensor layer 200. The first communication line DTL may include various communication lines to transmit driving information to the host processor 1000C. For example, the first communication line DTL may include general-purpose input/output (GPIO).

Figure 6:
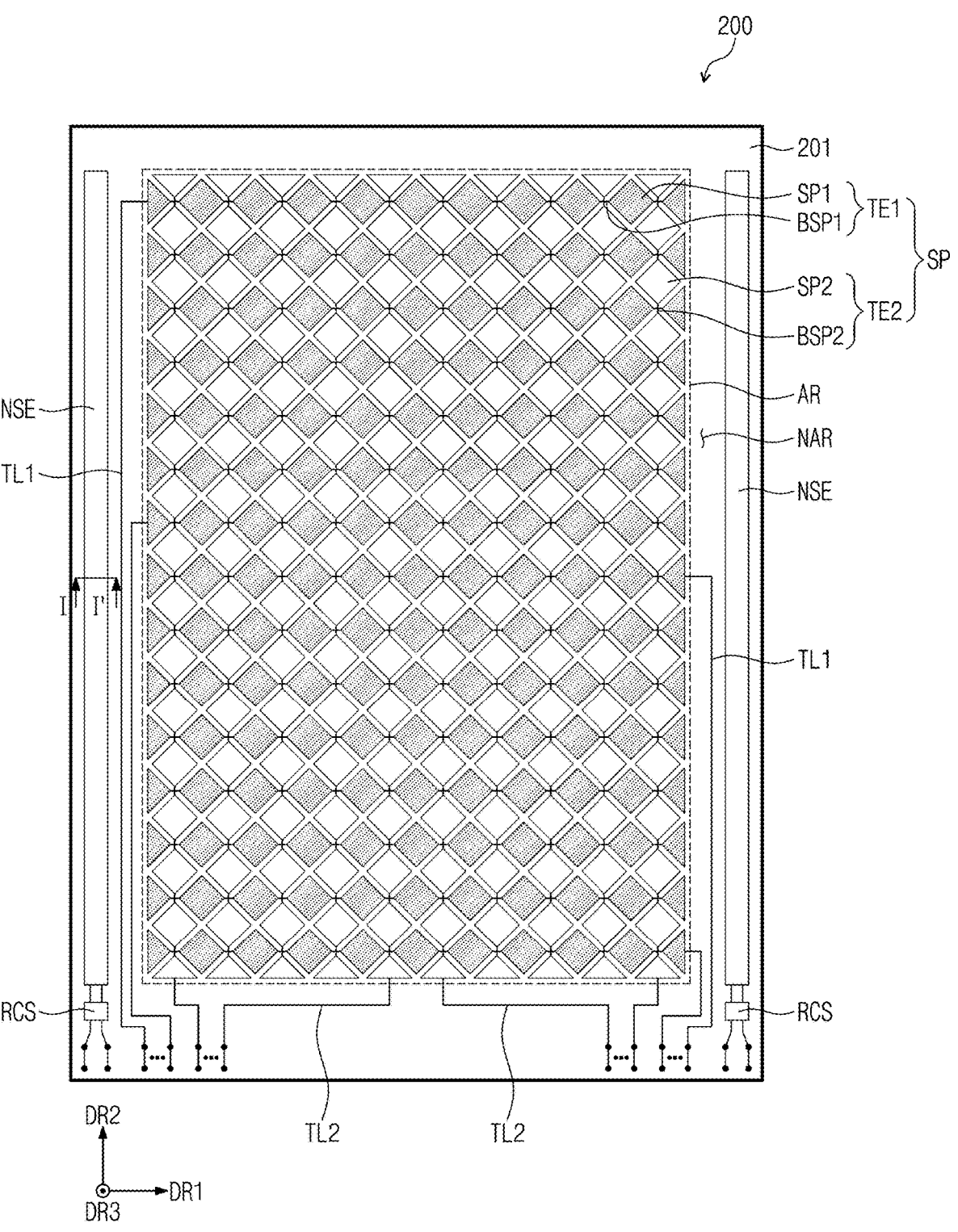
FIG. 6 is a plan view of a sensor layer according to an embodiment of the disclosure.
Figure 7:
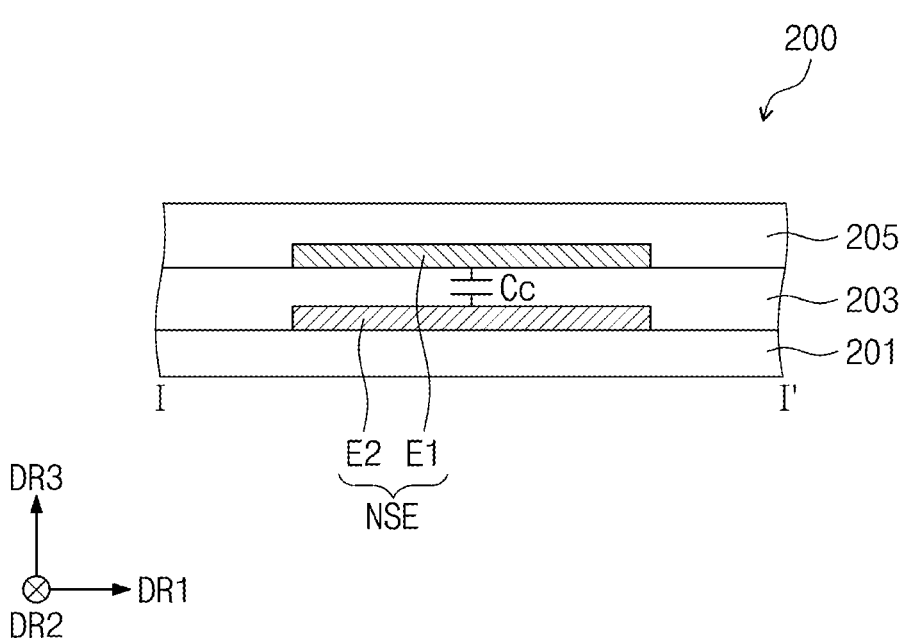
FIG. 7 is a schematic cross-sectional view of a sensor layer taken along I-I' of FIG. 6 according to an embodiment of the disclosure.

FIG. 6 is a plan view of a sensor layer according to an embodiment of the disclosure, and FIG. 7 is a schematic cross-sectional view of a sensor layer taken along line I-I' of FIG. 6 according to an embodiment of the disclosure.

Referring to FIGS. 5 to 7, the sensor layer 200 may include an active region AR and a peripheral region NAR adjacent to the active region AR. The active region AR may be a region which is activated by an electrical signal. The active region AR may be a region for sensing an input. The active region AR may overlap the display region DP-DA of the display layer 100 in a plan view. The peripheral region NAR may overlap the peripheral region DP-NDA of the display layer 100 in a plan view.

The sensor layer 200 may include a base layer 201, multiple sensing electrodes SP, multiple sensing lines TL1 and TL2, a noise measuring electrode NSE, and a resistance control circuit RCS. Multiple first sensing electrodes TE1 and multiple second sensing electrodes TE2 may be disposed in the active region AR, and the sensing lines TL1 and TL2, the noise measuring electrode NSE, and the resistance control circuit RCS may be disposed in the peripheral region NAR. However, the configuration of the resistance control circuit RCS is not limited thereto. For example, the resistance control circuit RCS may be mounted on the flexible substrate CF without being included in the sensor layer 200.

The base layer 201 may be an inorganic layer including at least one of silicon nitride, silicon oxynitride, and silicon oxide. In another embodiment, the base layer 201 may be an organic layer including an epoxy resin, an acrylic resin, or an imide-based resin. The base layer 201 may be formed directly on the display layer 100. In another embodiment, the base layer 201 may be coupled to the display layer 100 through an adhesive member.

The sensing electrodes SP may include the first sensing electrodes TE1 and the second sensing electrodes TE2. The sensor layer 200 may acquire information of an external input through a change in capacitance between the first sensing electrodes TE1 and the second sensing electrodes TE2.

Each of the first sensing electrodes TE1 may extend in the first direction DR1, and the first sensing electrodes TE1 may be arranged in the second direction DR2. Each of the first sensing electrodes TE1 may include multiple first parts SP1 and multiple second parts BSP1. The first parts SP1 and the second parts BSP1 may be included in the second conductive layer 204 (see FIG. 4).

Each of the second parts BSP1 may electrically connect two adjacent first parts SP1. The first parts SP1 and the second parts BSP1 may have a mesh structure. The first parts SP1 may be referred to as multiple first sensing part SP1. Multiple second parts BSP1 may be referred to as multiple first connection parts BSP1.

The second sensing electrodes TE2 may extend in the second direction DR2, and may be arranged in the first direction DR1. The second sensing electrodes TE2 may include multiple sensing patterns SP2 and multiple bridge patterns BSP2. The sensing patterns SP2 may be included in the second conductive layer 204 (see FIG. 4). The bridge patterns BSP2 may be included in the first conductive layer 202 (see FIG. 4).

Each of the bridge patterns BSP2 may electrically connect two adjacent sensing patterns SP2. The sensing patterns SP2 may have a mesh structure. The sensing patterns SP2 may be referred to as the second sensing units SP2. The bridge patterns BSP2 may be referred to as the second connection units BSP2.

The second parts BSP1 and the bridge patterns BSP2 may be disposed at different layers. The bridge patterns BSP2 may be insulated from the first sensing electrodes TE1 while crossing the first sensing electrodes TE1. For example, the second parts BSP1 may be insulated from the bridge patterns BSP2, respectively while crossing the bridge patterns BSP2.

The sensing lines TL1 and TL2 may include multiple first sensing lines TL1 and multiple second sensing lines TL2. The first sensing lines TL1 may be electrically connected to the first sensing electrodes TE1, respectively. The second sensing lines TL2 may be electrically connected to the second sensing electrodes TE2, respectively.

The first sensing lines TL1 may be electrically connected to the first sensing pads TD1 through contact holes, respectively. The sensor driver 200C may receive the receive signal RS (see FIG. 2) from the first sensing electrodes TE1 through the first sensing lines TL1.

The second sensing lines TL2 may be electrically connected to the second sensing pads TD2 through contact holes, respectively. The sensor driver 200C may transmit the transmit signal TS (see FIG. 2) to the second sensing electrodes TE2 through the second sensing lines TL2.

The noise measuring electrode NSE may extend in the second direction DR2. The noise measuring electrode NSE may be connected to the resistance control circuit RCS. The noise measuring electrode NSE may be electrically connected to the third sensing pads TD3 through the contact holes.

Multiple noise measuring electrodes NSE may be provided. The noise measuring electrodes NSE may be spaced apart from each other in the first direction DR1 while the active region AR interposed between the noise measuring electrodes NSE.

The noise measuring electrode NSE may include a first electrode E1 and a second electrode E2. The first electrode E1 may be spaced apart from the sensing electrodes SP while the first sensing lines TL1 interposed between the first electrode E1 and the sensing electrodes SP. The second electrode E2 may be adjacent to the first electrode E1.

The first electrode E1 and the second electrode E2 may be disposed in different layers.

The second electrode E2 may be disposed on the base layer 201. The second electrode E2 and the first conductive layer 202 may be disposed in a same layer. The sensing insulating layer 203 may cover the second electrode E2. The second electrode E2 may extend in the second direction DR2.

The first electrode E1 may be disposed on the second electrode E2. The first electrode E1 may be disposed on the sensing insulating layer 203. The first electrode E1 and the second conductive layer 204 may be disposed in a same layer. The cover insulating layer 205 may cover the first electrode E1. The first electrode E1 may extend in the second direction DR2.

In a plan view, the first electrode E1 and the second electrode E2 may overlap each other. In a plan view, the first electrode E1 and the second electrode E2 may be spaced apart from the first sensing lines TL1 in the first direction DR1.

The first electrode E1 and the second electrode E2 may form a noise capacitor Cc.

Figure 8A:
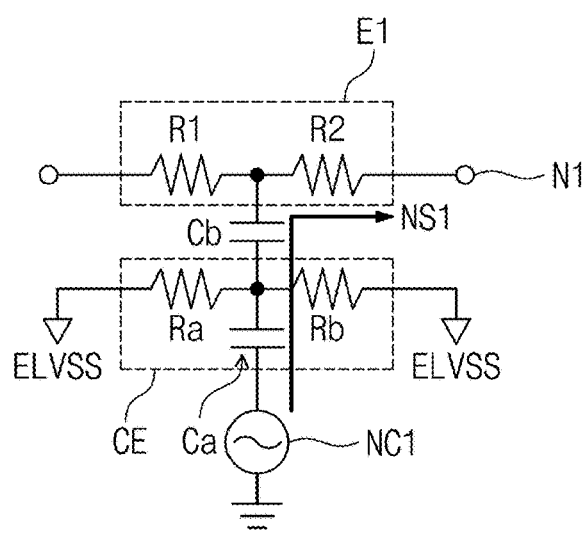
FIG. 8A is a schematic diagram of an equivalent circuit of a first electrode to sense capacitive noise according to an embodiment of the disclosure.

FIG. 8A is a schematic diagram of an equivalent circuit of a first electrode to sense capacitive noise according to an embodiment of the disclosure.

Referring to FIGS. 2 and 8A, the first electrode E1 may be connected to a first node N1. The first electrode E1 may include resistors R1 and R2.

A cathode electrode CE may receive a second power voltage ELVSS having a voltage level lower than a voltage of the first power voltage ELVDD (see FIG. 5). The cathode electrode CE may include cathode resistors Ra and Rb.

The first noise source NC1 may be configured to provide a display signal to the display layer 100. For example, the first noise source NC1 may include a driving controller 100C.

The display signal may be transmitted to the cathode electrode CE through a capacitor Ca formed between the first noise source NC1 and the cathode electrode CE while serving as a first noise signal NS1, and may be applied to the sensor layer 200 through a parasitic capacitor Cb formed between the display layer 100 and the sensor layer 200. The first noise signal NS1 may be referred to as a capacitive noise signal.

The first noise signal NS1 may be transmitted to the sensor layer 200 by noise, low frequency noise, process deviation, offset, and/or abnormal film formation of the cathode electrode CE of the display layer 100.

The parasitic capacitor Cb may be formed between the cathode electrode CE and the first electrode E1.

In case that the abnormal film formation of the cathode electrode CE is caused, the sizes of the first cathode resistor Ra and the second cathode resistor Rb of the cathode electrode CE may be different from each other. For example, in case that the abnormal film formation is caused in a region of the cathode electrode CE having the second cathode resistor Rb, the size of the second cathode resistor Rb may be greater than the size of the first cathode resistor Ra. Accordingly, the first noise signal NS1 may be transmitted to the first electrode E1 through the parasitic capacitor Cb, instead of being transmitted to the terminal applied with the second power voltage ELVSS. The first noise signal NS1 may be transmitted to the first node N1 along the first electrode E1.

The first node N1 may be electrically connected to the sensor driver 200C. The sensor driver 200C may receive the first noise signal NS1 generated by the parasitic capacitor Cb.

The sensor driver 200C may individually amplify and convert the received first noise signal NS1 and the receive signal RS to acquire a noise-free signal. The details thereof will be described below.

Figure 8B:
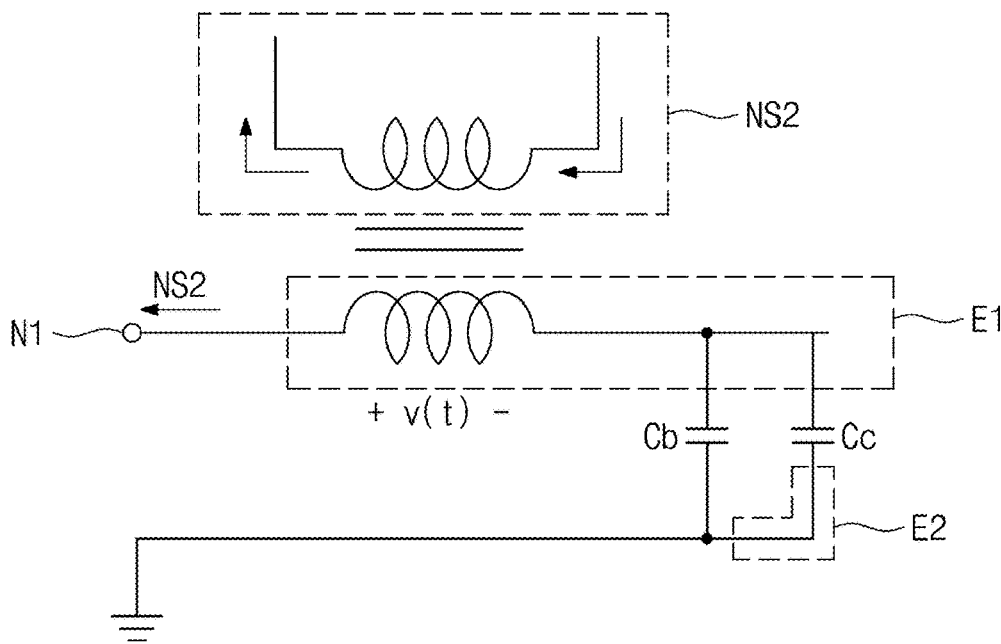
FIG. 8B is a schematic diagram of an equivalent circuit of a noise measuring electrode to sense inductive noise according to an embodiment of the disclosure.

FIG. 8B is a schematic diagram of an equivalent circuit of a noise measuring electrode to sense inductive noise according to an embodiment of the disclosure.

Referring to FIGS. 2 and 8B, the second noise source NC2 may form a magnetic field. For example, the second noise source NC2 may include a wireless power transmitting/receiving member of the power module 1500 (see FIG. 1).

An induced electromotive force v(t) may be generated from the first electrode E1 through the second noise source NC2. An induced current generated based on the induced electromotive force v(t) may be transmitted to the first node N1 while serving as a second noise signal NS2. The second noise signal NS2 may be referred to as an inductive noise signal.

The induced current may be expressed as in Equation 1 below.

$$i(t) = (Cb + Cc)\frac{dv(t)}{dt} \qquad \text{[Equation 1]}$$

In Equation 1, i(t) may be an induced current, Cb may be a capacitance of the parasitic capacitor, Cc may be a capacitance of the noise capacitor, and v(t) may be the induced electromotive force. 'd/dx' may be a symbol representing differentiation.

An end of each of the parasitic capacitor Cb and the noise capacitor Cc may be grounded. The end of the noise capacitor Cc may be the second electrode E2.

The capacitance of the noise capacitor Cc may be greater than the capacitance of the parasitic capacitor Cb.

Unlike the disclosure, in case that the noise measuring electrode NSE (see FIG. 7) does not include the second electrode E2, the noise capacitor Cc may not be formed. The noise affects the touch of the sensor layer due to the magnetic field, but the induced current formed by only the parasitic capacitor Cb is negligible, as compared to an embodiment in which the noise capacitor Cc is formed. Accordingly, the induced current may not be measured. Accordingly, it may be difficult to remove noise. However, according to the disclosure, the noise measuring electrode NSE may include the first electrode E1 and the second electrode E2 spaced apart from each other to form the noise capacitor Cc. The induced current may be relatively increased through Equation 1 by the noise capacitor Cc. The second noise signal NS2 may be provided to the first node N1. The sensor driver 200C may readily sense the inductive noise. Accordingly, the electronic device 1000 may be improved in sensing reliability and accuracy.

Figure 9:
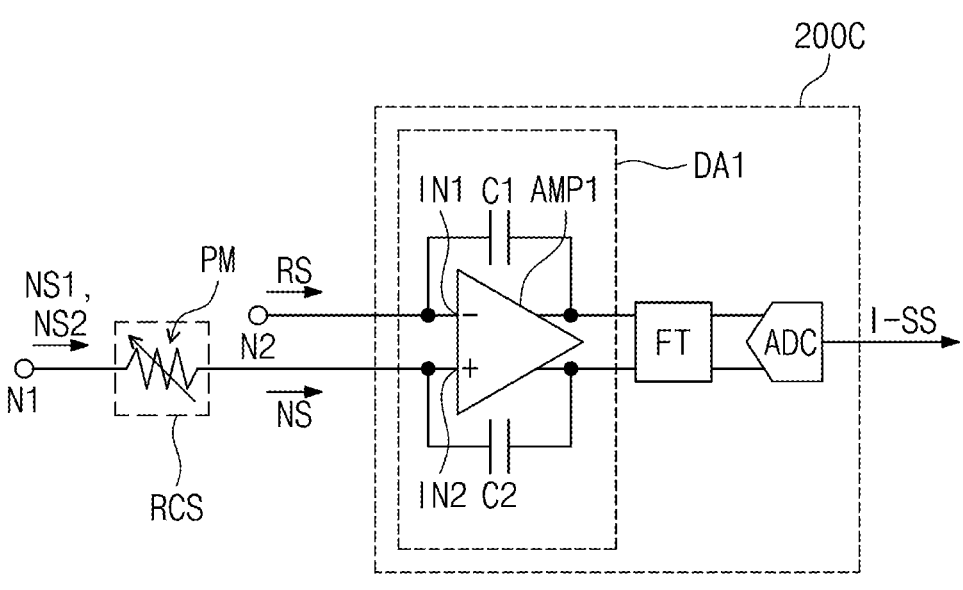
FIG. 9 is a schematic diagram of an equivalent circuit of a sensor driver according to an embodiment of the disclosure.

FIG. 9 is a schematic diagram of an equivalent circuit of a sensor driver according to an embodiment of the disclosure.

Referring to FIGS. 6 and 9, the first node N1 may be electrically connected to a noise measuring electrode NSE. For example, the first node N1 may be connected to the first electrode E1. The first noise signal NS1 and the second noise signal NS2 may be provided to the resistance control circuit RCS through the first node N1. The resistance control circuit RCS may include a variable resistor PM.

A second node N2 may be electrically connected to each of the first sensing electrodes TE1. For example, the second node N2 may be connected to the first sensing lines TL1 and the first sensing pads TD1. The receive signal RS may be provided through the second node N2.

The first noise signal NS1 and the second noise signal NS2, which have passed through the resistance control circuit RCS, may be converted into a conversion signal NS. The resistance control circuit RCS may control the magnitude and phase of the conversion signal NS, such that the magnitude and the phase of a conversion signal NS are equal to the magnitude and the phase of the receive signal RS. In other words, the resistance control circuit RCS may be a component for impedance matching between the second noise signal NS2 and the receive signal RS.

The sensor driver 200C may include a first differential circuit DA1, a filter FT, and a converting circuit ADC. The sensor driver 200C may be implemented in a form of an analog front end (AFE) including at least one amplifier.

The first differential circuit DA1 may receive the receive signal RS and a conversion signal NS. The first differential circuit DA1 may independently amplify and output the receive signal RS and the conversion signal NS. The first differential circuit DA1 may include a first amplifier AMP1. For example, the first amplifier AMP1 may include an operational amplifier (OP).

The first differential circuit DA1 may include a first input terminal IN1 and a second input terminal IN2.

The first input terminal IN1 may be electrically connected to the second node N2. In other words, the first input terminal IN1 may be electrically connected to one of the sensing lines TL1 and TL2. The receive signal RS may be provided to the first input terminal IN1. The first input terminal IN1 may be referred to as an inverted input terminal. A first capacitor C1 may be connected in parallel between the first input terminal IN1 and an output terminal. The first capacitor C1 may control the magnitude of the receive signal RS.

The second input terminal IN2 may be electrically connected to the first node N1. In other words, the second input terminal IN2 may be electrically connected to the first electrode E1. The conversion signal NS may be provided to the second input terminal IN2. The second input terminal IN2 may be referred to as a non-inverted input terminal. A second capacitor C2 may be connected in parallel between the second input terminal IN2 and the output terminal. The second capacitor C2 may control the magnitude of the conversion signal NS.

In case that multiple first differential circuits DA1 are provided, the first sensing lines TL1 may be connected to the multiple first differential circuits DA1, respectively. The second input terminal IN2 of each of the first differential circuits DA1 may be connected in common to the first electrode E1. However, the connection relationship of the second input terminal IN2 of each of the first differential circuits DA1 is not limited thereto. For example, some of the second input terminals IN2 of the first differential circuits DA1 may be electrically connected to the first electrode E1, and the remaining second input terminals IN2 of the first differential circuits DA1 may be grounded or may receive a constant voltage. In other words, the noise measuring electrode NSE may be connected only to some, which is weak for noise, of the first differential circuits DA1 connected to the first sensing electrode TE1.

According to the disclosure, the output terminal of the first different circuit DA1 may remove noise by superimposing the signals provided from the first input terminal IN1 and the second input terminal IN2 and canceling the noise signals, which are provided from the first input terminal IN1 and the second input terminal IN2, from each other. The first differential circuit DA1 may operate in a common mode. Accordingly, an undesirable signal may be removed, and a desirable signal may not be distorted. Capacitive noise of the sensor layer 200 may be removed based on the first noise signal NS1, and inductive noise of the sensor layer 200 may be removed based on the second noise signal NS2. Both capacitive noise and inductive noise may be removed through the first differential circuit DA1. Sensitivity may be improved by increasing the signal-to-noise ratio (SNR) of the sensor layer 200. Accordingly, the electronic device 1000 (see FIG. 1) reduced or removed in a noise component may be provided, and electronic device 1000 (see FIG. 1) improved in sensing reliability and accuracy may be provided.

Unlike the disclosure, in case that the resistance control circuit RCS is absent between the noise measuring electrode NSE and the sensor driver 200C, the second noise signal NS2, which is unconverted, may be provided to the first differential circuit DA1. In case that impedance matching is not performed, the inductive noise may be failed to be readily canceled through the differential circuit. However, according to the disclosure, the electronic device 1000 (see FIG. 1) may include a component to control the resistance of the noise measuring electrode NSE. For example, the electronic device 1000 (see FIG. 1) may include the resistance control circuit RCS connected between the noise measuring electrode NSE and the sensor driver 200C. The second noise signal NS2 sensed by the noise measuring electrode NSE may include inductive noise. The second noise signal NS2 may be impedance-matched by the resistance control circuit RCS to be converted into the conversion signal NS. The first differential circuit DA1 may remove the inductive noise from the receive signal RS based on the conversion signal NS. Accordingly, the electronic device 1000 (see FIG. 1) improved in sensing reliability and accuracy may be provided.

A filter FT may be connected to the first differential circuit DA1. The filter FT may include a band pass filter and a low pass filter.

The converting circuit ADC may be connected to the filter FT. The converting circuit ADC may convert an analog signal, which is input from the filter FT, into a digital signal. The converting circuit ADC may include an analog-to-digital converter. The converting circuit ADC may output a coordinate signal I-SS.

Figure 10:
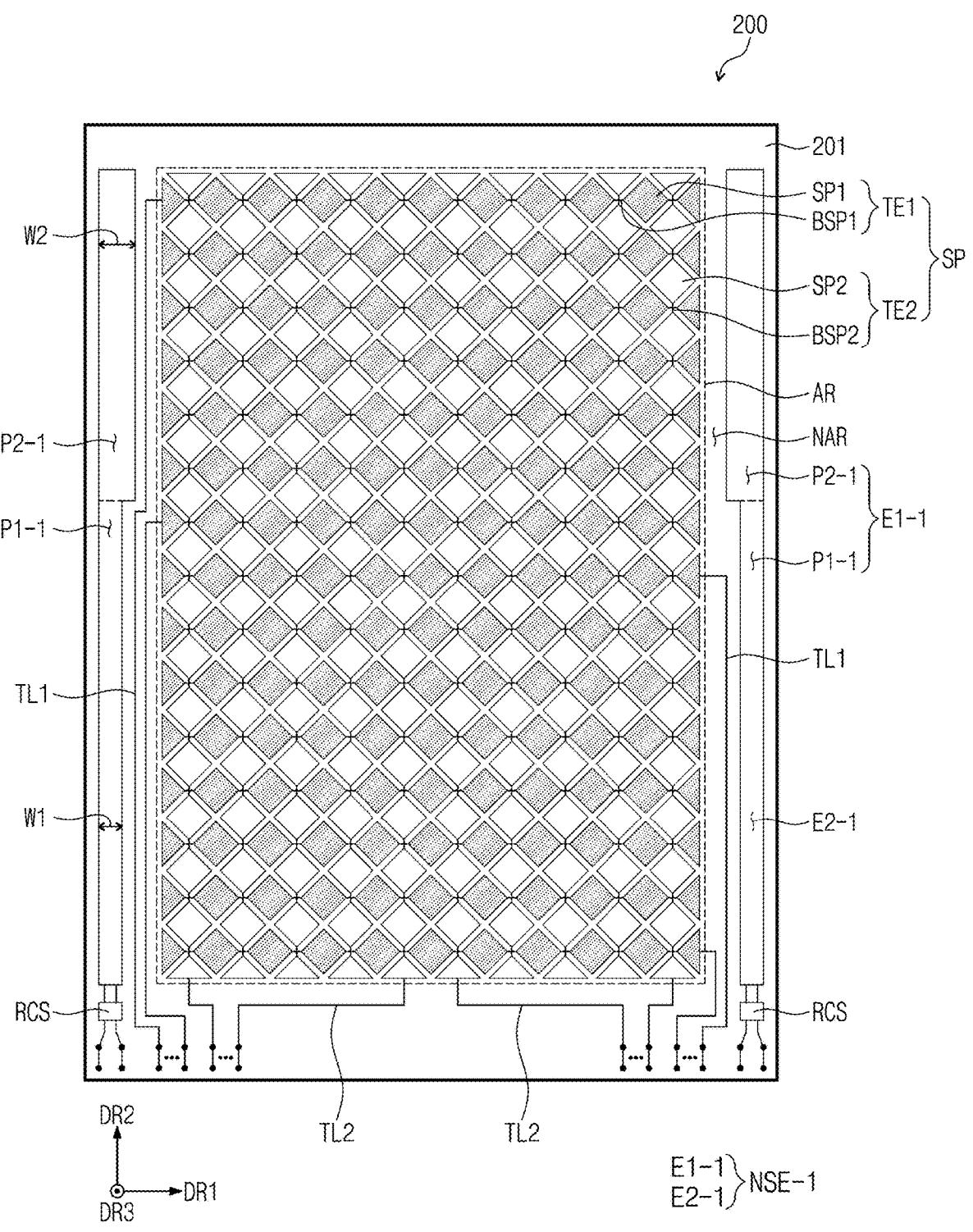
FIG. 10 is a plan view of a sensor layer according to an embodiment of the disclosure.

FIG. 10 is a plan view of a sensor layer according to an embodiment of the disclosure. In the following description made with reference to FIG. 10, the same reference numerals will be assigned to the components described with reference to FIG. 6, and the details thereof will be omitted.

Referring to FIG. 10, a noise measuring electrode NSE-1 may be disposed in the peripheral region NAR. The noise measuring electrode NSE-1 may include a first electrode E1-1 and a second electrode E2-1. The first electrode E1-1 may be spaced apart from the sensing electrodes SP in the first direction DR1 while the first sensing lines TL1 interposed between the first electrode E1-1 and the sensing electrodes SP.

The first electrode E1-1 and the second electrode E2-1 may be disposed in different layers. The first electrode E1-1 may be disposed on the second electrode E2-1. In a plan view, the first electrode E1-1 and the second electrode E2-1 may overlap each other.

The first electrode E1-1 may include a first part P1-1 and a second part P2-1 extending from the first part P1-1. The first part P1-1 and the second part P2-1 may be provided integrally with each other.

The first part P1-1 may extend in the second direction DR2. The first part P1-1 may be disposed adjacent to the sensor driver 200C. The first part P1-1 may have a first width W1 in the first direction DR1.

The second part P2-1 may extend in the second direction DR2. The second part P2-1 may be spaced apart from the sensor driver 200C while the first part P1-1 interposed between the second part P2-1 and the sensor driver 200C. The second part P2-1 may have a second width W2 in the first direction DR1. The second width W2 may be greater than the first width W1. In other words, the second part P2-1 may be wider than the first part P1-1.

The second electrode E2-1 may include a first part corresponding to the first part P1-1 and a second part corresponding to the second part P2-1. In a plan view, the first electrode E1-1 and the second electrode E2-1 may have a same shape.

The capacitance of the noise capacitor Cc (see FIG. 8B) between the second part P2-1 of the first electrode E1-1 and the second part of the second electrode E2-1 may be greater than the capacitance of the noise capacitor Cc (see FIG. 8B) between the first part P1-1 of the first electrode E1-1 and the first part of the second electrode E2-1.

In other words, the capacitance of the noise capacitor Cc (see FIG. 8B) formed between the first electrode E1-1 and the second electrode E2-1 may be greater than the capacitance of the noise capacitor formed between the first electrode and the second electrode having constant widths.

According to the disclosure, an induced current may be relatively increased by the noise capacitor Cc. The second noise signal NS2 (see FIG. 8B) may be provided to the first node N1. The sensor driver 200C (see FIG. 2) may readily sense and remove the inductive noise. Accordingly, the electronic device 1000 (see FIG. 2) may be improved in sensing reliability and accuracy.

Figure 11:
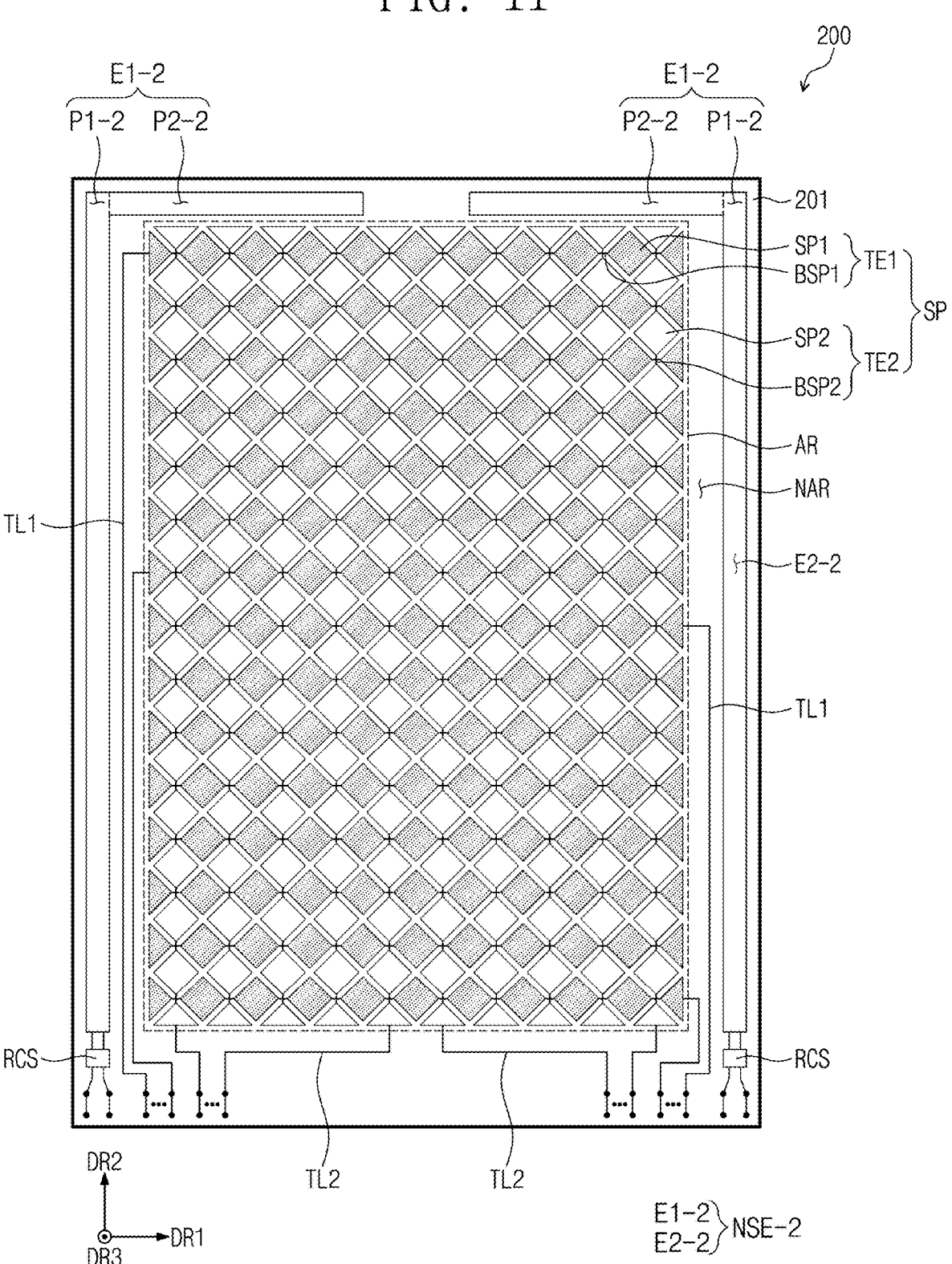
FIG. 11 is a plan view of a sensor layer according to an embodiment of the disclosure.

FIG. 11 is a plan view of a sensor layer according to an embodiment of the disclosure. In the following description made with reference to FIG. 11, the same reference numerals will be assigned to the components described with reference to FIG. 6, and the details thereof will be omitted.

Referring to FIG. 11, a noise measuring electrode NSE-2 may be disposed in the peripheral region NAR. The noise measuring electrode NSE-2 may include a first electrode E1-2 and a second electrode E2-2.

The first electrode E1-2 and the second electrode E2-2 may be disposed in different layers. The first electrode E1-2 may be disposed on the second electrode E2-2. In a plan view, the first electrode E1-2 and the second electrode E2-2 may overlap each other.

The first electrode E1-2 may include a first part P1-2 and a second part P2-2 extending from the first part P1-2. The first part P1-2 and the second part P2-2 may be provided integrally with each other.

The first part P1-2 may extend in the second direction DR2. The first part P1-2 may be spaced apart from the first sensing lines TL1 in the first direction DR1.

The second part P2-2 may extend from an end of the first part P1-2 in the first direction DR1. In a plan view, the second part P2-2 may be disposed on the sensing electrodes SP.

The second electrode E2-2 may include a first part corresponding to the first part P1-2 and a second part corresponding to the second part P2-2. In a plan view, the first electrode E1-2 and the second electrode E2-2 may have a same shape.

The capacitance of the noise capacitor Cc (see FIG. 8B) formed between the first electrode E1-2 and the second electrode E2-2 may be defined by a region in which the first electrode E1-2 overlap the second electrode E2-2.

Figure 12A:
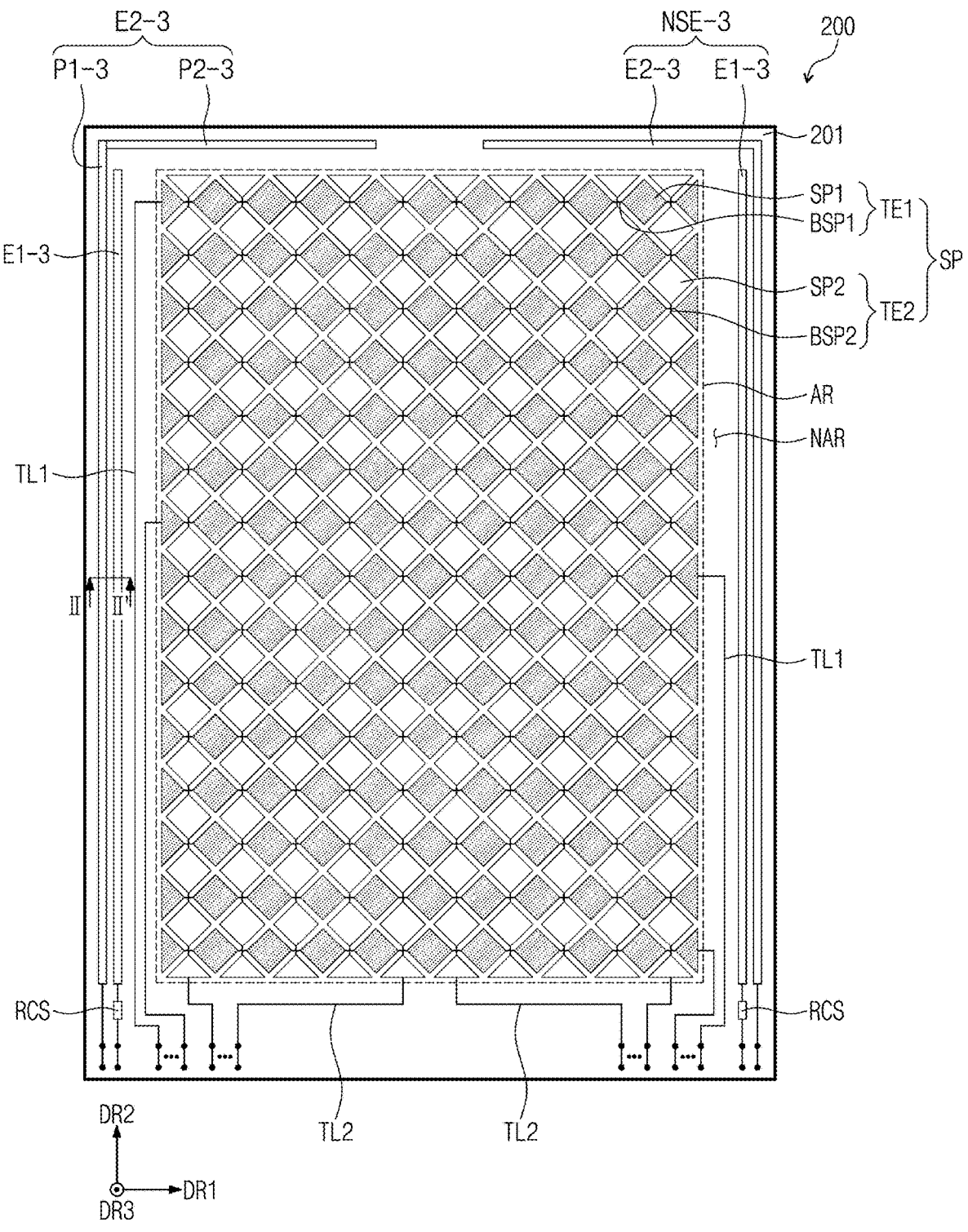
FIG. 12A is a plan view of a sensor layer according to an embodiment of the disclosure.
Figure 12B:
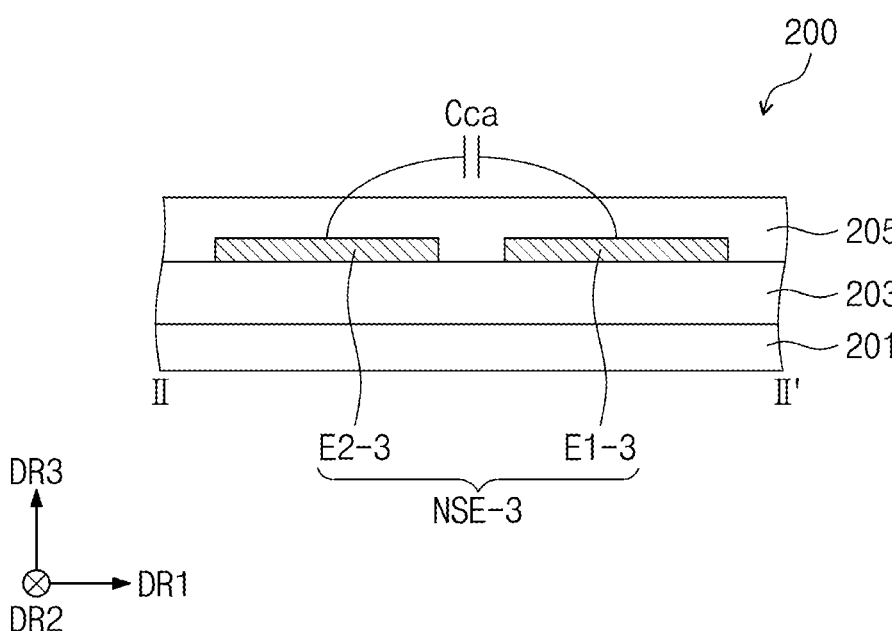
FIG. 12B is a schematic cross-sectional view of a sensor layer taken along line II-II' of FIG. 12A according to an embodiment of the disclosure.

FIG. 12A is a plan view of a sensor layer according to an embodiment of the disclosure, and FIG. 12B is a schematic cross-sectional view of a sensor layer taken along line II-II' of FIG. 12A according to an embodiment of the disclosure. In the following description made with reference to FIGS. 12A and 12B, the same reference numerals will be assigned to the components described with reference to FIGS. 6 and 7, and the details thereof will be omitted.

Referring to FIGS. 12A and 12B, a noise measuring electrode NSE-3 may be disposed in the peripheral region NAR. The noise measuring electrode NSE-3 may include a first electrode E1-3 and a second electrode E2-3.

The first electrode E1-3 and the second electrode E2-3 may be disposed in a same layer. The first electrode E1-3 and the second electrode E2-3 may be disposed on the sensing insulation layer 203. However, the arrangement relationship between the first electrode E1-3 and the second electrode E2-3 is not limited thereto. For example, the first electrode E1-3 and the second electrode E2-3 may be disposed on the base layer 201.

The first electrode E1-3 may extend in the second direction DR2. The first electrode E1-3 may be spaced apart from the sensing electrodes SP in the first direction DR1 while the first sensing lines TL1 interposed between the first electrode E1-3 and the first sensing lines TL1. The first electrode E1-3 may be connected to the resistance control circuit RCS.

The second electrode E2-3 may be disposed at an outermost portion of the peripheral region NAR. The second electrode E2-3 may be electrically connected to the ground pad of the sensor driver 200C (see FIG. 2).

According to the disclosure, the static electricity introduced from the outside may be disposed at the outermost portion and may be blocked by the second electrode E2-3 electrically connected to the ground pad. The second electrode E2-3 may prevent electrostatic discharge (ESD). Accordingly, the electronic device 1000 (see FIG. 1) may be improved in reliability.

The second electrode E2-3 may include a first part P1-3 and a second part P2-3 extending from the first part P1-3. The first part P1-3 and the second part P2-3 may be provided integrally with each other.

The first part P1-3 may extend in the second direction DR2. The first part P1-3 may be spaced apart from the first sensing lines TL1 in the first direction DR1 while the first electrode E1-3 interposed between the first part P1-3 and the first sensing lines TL1.

The second part P2-3 may extend from an end of the first part P1-3 in the first direction DR1. In a plan view, the second part P2-3 may be disposed on the sensing electrodes SP.

A noise capacitor Cca may be formed between the first electrode E1-3 and the second electrode E2-3.

According to the disclosure, an induced current may be relatively increased by the noise capacitor Cca. The second noise signal NS2 (see FIG. 8B) may be provided to the first node N1. The sensor driver 200C (see FIG. 2) may readily sense and remove the inductive noise. Accordingly, the electronic device 1000 (see FIG. 2) may be improved in sensing reliability and accuracy.

Figure 13A:
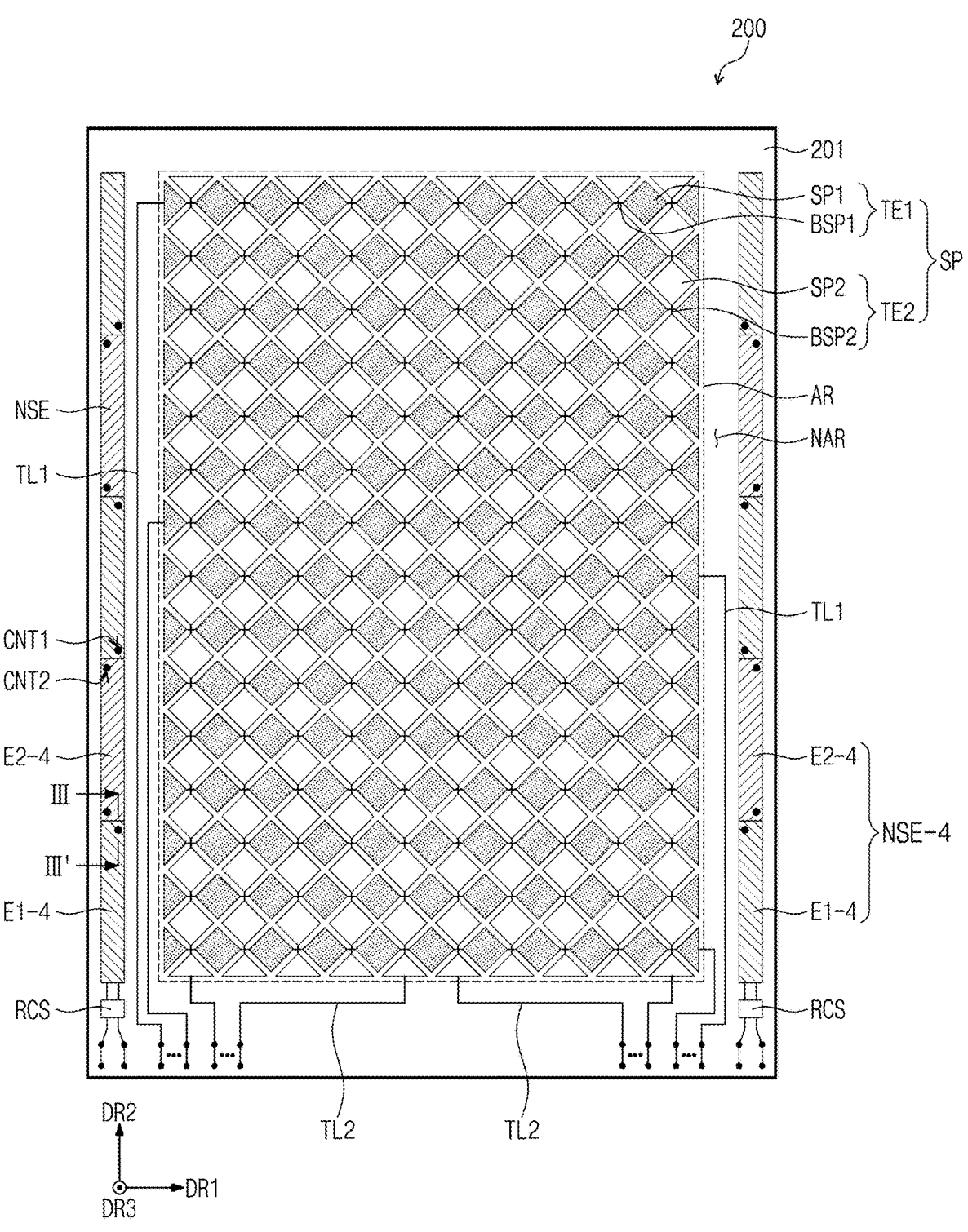
FIG. 13A is a plan view of a sensor layer according to an embodiment of the disclosure.
Figure 13B:
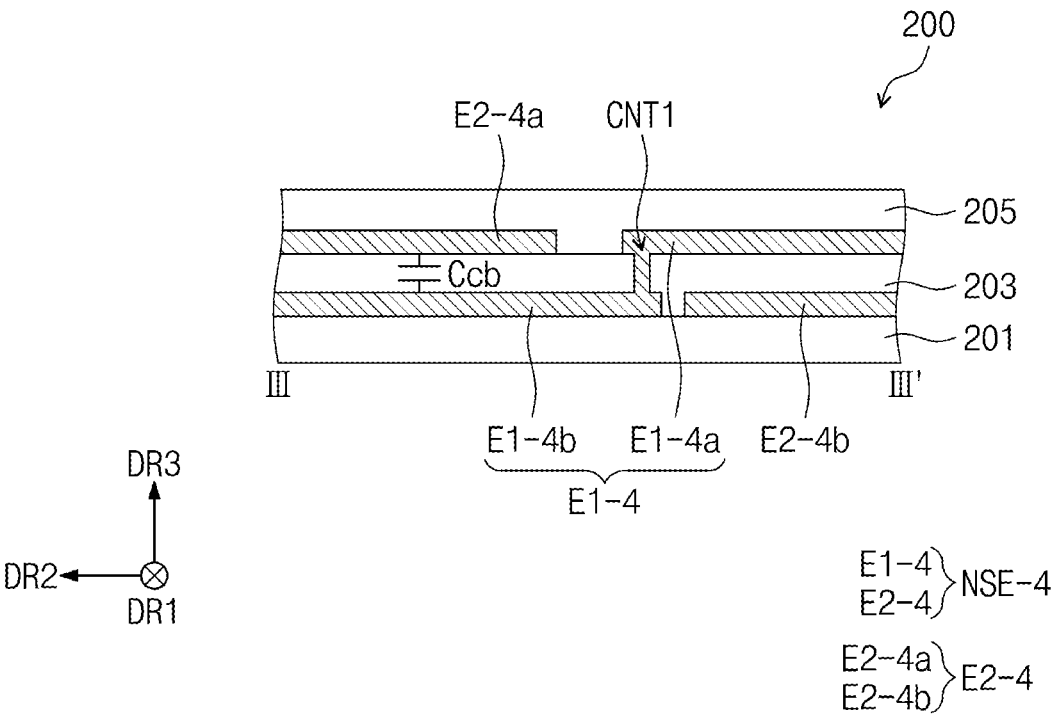
FIG. 13B is a schematic cross-sectional view of a sensor layer taken along line III-III' of FIG. 13A according to an embodiment of the disclosure.

FIG. 13A is a plan view of a sensor layer according to an embodiment of the disclosure, and FIG. 13B is a schematic cross-sectional view of a sensor layer taken along line III-III' of FIG. 13A according to an embodiment of the disclosure. In the following description made with reference to FIGS. 13A and 13B and 12B, the same reference numerals will be assigned to the components described with reference to FIGS. 6 and 7, and the details thereof will be omitted.

Referring to FIGS. 13A and 13B, the noise measuring electrode NSE-4 may be disposed in the peripheral region NAR. The noise measuring electrode NSE-4 may include a first electrode E1-4 and a second electrode E2-4.

In a plan view, the first electrode E1-4 and the second electrode E2-4 may overlap each other. The first electrode E1-4 and the second electrode E2-4 may be alternately disposed in the second direction DR2. For example, the first electrode E1-4 may be disposed on the second electrode E2-4 or the second electrode E2-4 may be disposed on the first electrode E2-4 in the second direction DR2.

The first electrode E1-4 may include a first auxiliary electrode E1-4a and a second auxiliary electrode E1-4b. The first auxiliary electrode E1-4a and the second auxiliary electrode E1-4b may be disposed in different layers, and may be electrically connected to each other through the first contact hole CNT1.

The first auxiliary electrode E1-4a may be disposed on the sensing insulation layer 203. The second auxiliary electrode E1-4b may be disposed under the first auxiliary electrode E1-4a. The second auxiliary electrode E1-4b may be disposed on the base layer 201.

The second electrode E2-4 may include a third auxiliary electrode E2-4a and a fourth auxiliary electrode E2-4b. The third auxiliary electrode E2-4a and the fourth auxiliary electrode E2-4b may be disposed in different layers, and may be electrically connected to each other through the second contact hole CNT2.

The third auxiliary electrode E2-4a may be disposed on the sensing insulation layer 203. The third auxiliary electrode E2-4a may be disposed on the second auxiliary electrode E1-4b and the fourth auxiliary electrode E2-4b. In a plan view, the third auxiliary electrode E2-4a and the second auxiliary electrode E1-4b may overlap each other. The fourth auxiliary electrode E2-4b may be disposed under the third auxiliary electrode E2-4a. The fourth auxiliary electrode E2-4b may be disposed on the base layer 201. In a plan view, the fourth auxiliary electrode E2-4b and the first auxiliary electrode E1-4a may overlap each other.

According to an embodiment of the disclosure, the resistance control circuit RCS (see FIG. 6) may be omitted. The first electrode E1-4 may include a first auxiliary electrode E1-4a and a second auxiliary electrode E1-4b connected through the contact hole CNT1, and the second electrode E2-4 may include a third auxiliary electrode E2-4a and a fourth auxiliary electrode E2-4b connected through a contact hole CNT2. Resistances of each of the first electrode E1-4 and the second electrode E2-4 may be increased by the contact holes CNT1 and CNT2. The resistance control circuit RCS (see FIG. 6) may function as the noise measuring electrode NSE-4.

According to the disclosure, the resistance of the noise measuring electrode NSE-4 may be adjusted through the structure of the noise measuring electrode NSE-4. The second noise signal NS2 (see FIG. 9) sensed by the noise measuring electrode NSE-4 may include inductive noise. The second noise signal NS2 (see FIG. 9) may be impedance-matched by the noise measuring electrode NSE-4 to be converted into the conversion signal NS (see FIG. 9). The first differential circuit DA1 (see FIG. 9) may remove the inductive noise from the receive signal RS (see FIG. 9), based on the conversion signal NS (see FIG. 9). Accordingly, the electronic device 1000 (see FIG. 1) may be improved in sensing reliability and accuracy.

Figure 14:
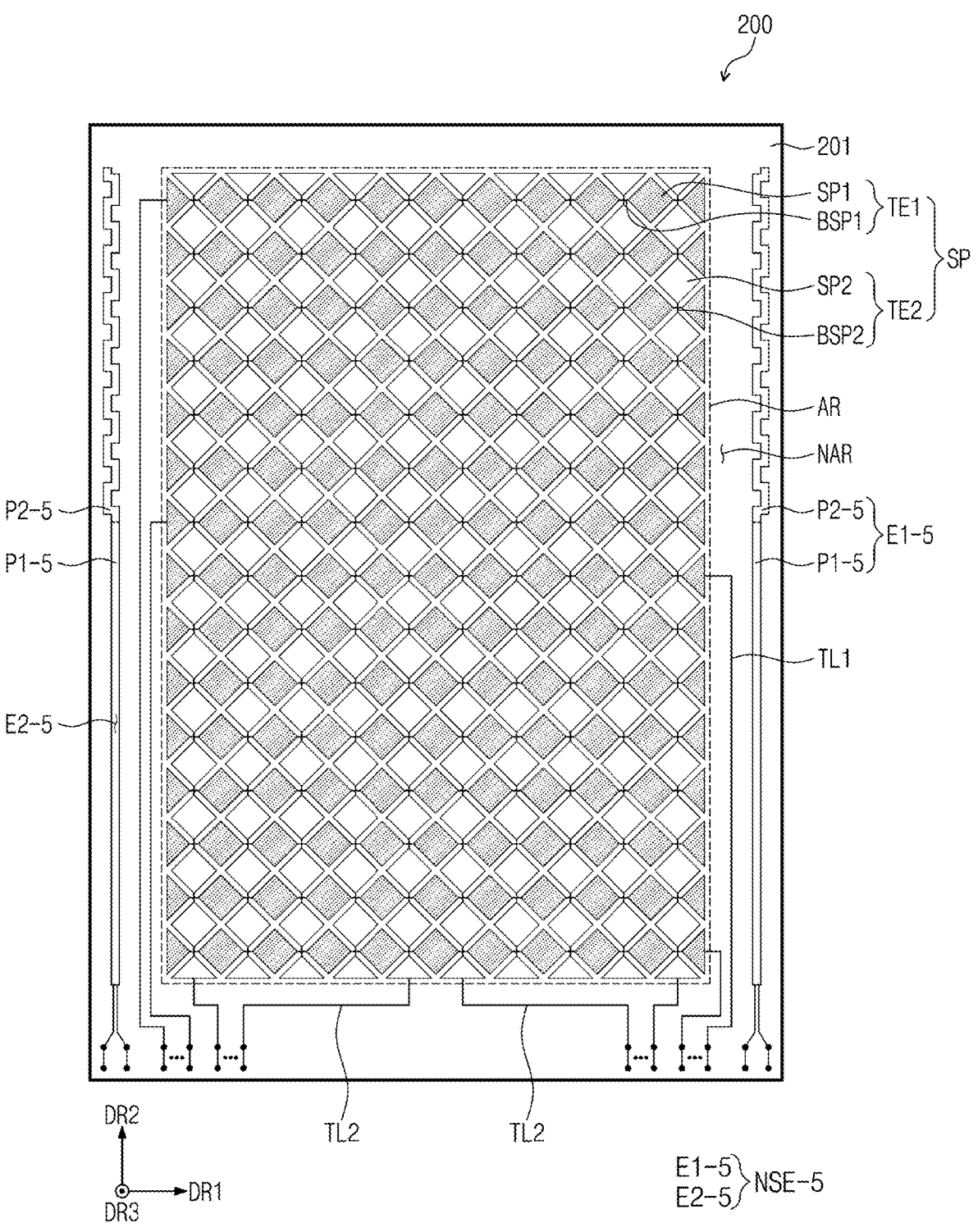
FIG. 14 is a plan view of a sensor layer according to an embodiment of the disclosure.

FIG. 14 is a plan view of a sensor layer according to an embodiment of the disclosure. In the following description made with reference to FIG. 14, the same reference numerals will be assigned to the components described with reference to FIG. 6, and the details thereof will be omitted.

Referring to FIG. 14, the noise measuring electrode NSE-5 may be disposed in the peripheral region NAR. The noise measuring electrode NSE-5 may include a first electrode E1-5 and a second electrode E2-5.

The first electrode E1-5 may be disposed on the second electrode E2-5. In a plan view, the first electrode E1-5 and the second electrode E2-5 may overlap each other.

In a plan view, the first electrode E1-5 and the second electrode E2-5 may be spaced apart from the first sensing lines TL1 in the first direction DR1.

The first electrode E1-5 may include a first part P1-5 and a second part P2-5 extending from the first part P1-5. The first part P1-5 and the second part P2-5 may be provided integrally with each other.

The first part P1-5 may extend in the second direction DR2.

The second part P2-5 may extend from an end of the first part P1-5 and may have a pattern. For example, the pattern may include a sawtooth pattern. The length of the second part P2-5 may be increased by the pattern as compared with the one having a shape extending in the second direction DR2. The resistance of the second part P2-5 may be increased by the pattern.

The second electrode E2-5 may include a first part corresponding to the first part P1-5 and a second part corresponding to the second part P2-5. In a plan view, the first electrode E1-5 and the second electrode E2-5 may have a same shape.

According to an embodiment of the disclosure, the resistance control circuit RCS (see FIG. 6) may be omitted. Each of the first electrode E1-5 and the second electrode E2-5 may include a second part P2-5 having a pattern. The resistance of each of the first electrode E1-5 and the second electrode E2-5 may be increased by the pattern. The noise measuring electrode NSE-5 may function as the resistance control circuit RCS (see FIG. 6).

According to the disclosure, the resistance of the noise measuring electrode NSE-5 may be adjusted through the structure of the noise measuring electrode NSE-5. The second noise signal NS2 (see FIG. 9) sensed by the noise measuring electrode NSE-5 may include inductive noise. The second noise signal NS2 (see FIG. 9) may be impedance-matched by the noise measuring electrode NSE-5 to be converted into the conversion signal NS (see FIG. 9). The first differential circuit DA1 (see FIG. 9) may remove the inductive noise from the receive signal RS (see FIG. 9) based on the conversion signal NS (see FIG. 9). Accordingly, the electronic device 1000 (see FIG. 1) may be improved in sensing reliability and accuracy.

FIG. 15 is a schematic diagram of an equivalent circuit of a sensor driver according to an embodiment of the disclosure. In the following description made with reference to FIG. 15, the same reference numerals will be assigned to the components described with reference to FIG. 9, and the details thereof will be omitted.

Referring to FIGS. 6 and 15, a sensor driver 200Ca may include the first differential circuit DA1, a second differential circuit DA2, the filter FT, and the converting circuit ADC.

A (2-1)-th node N2a and a (2-2)-th node N2b may be electrically connected to the first sensing electrodes TE1, respectively. For example, the (2-1)-th node N2a and the (2-2)-th node N2b may be connected to the first sensing lines TL1 and the first sensing pads TD1.

The (2-1)-th node N2a may be connected to one of the first sensing lines TL1, and the (2-2)-th node N2b may be connected to another one of the first sensing lines TL1. For example, the (2-1)-th node N2a may be electrically connected to one first sensing electrode of the first sensing electrodes TE1, and the (2-2)-th node N2b may be electrically connected to another first sensing electrode adjacent to the one first sensing electrode of the first sensing electrodes TE1.

A first receive signal RSa may be provided from the one of the first sensing electrodes TE1 through the (2-1)-th node N2a. A second receive signal RSb may be provided from the another one of the first sensing electrodes TE1 through the (2-2)-th node N2b.

The second differential circuit DA2 may receive the first receive signal RSa and the second receive signal RSb. The second differential circuit DA2 may independently amplify and output the first receive signal RSa and the second receive signal RSb. The second differential circuit DA2 may include a second amplifier AMP2. For example, the second amplifier AMP2 may include an operational amplifier (OP).

The second differential circuit DA2 may include a first input terminal IN1a and a second input terminal IN2a.

The first input terminal IN1a may be electrically connected to the (2-1)-th node N2a. The first receive signal RSa may be provided to the first input terminal IN1a. The first input terminal IN1a may be referred to as an inverted input terminal.

The second input terminal IN2a may be electrically connected to the (2-2)-th node N2b. The second receive signal RSb may be provided to the second input terminal IN2a. The second input terminal IN2a may be referred to as a non-inverted input terminal.

The output terminal of the second differential circuit DA2 may be connected to the first input terminal IN1 of the first differential circuit DA1.

The second differential circuit DA2 may provide a signal, which is output by independently sensing between two adjacent first sensing electrodes TE1, to the first input terminal IN1 of the first differential circuit DA1, and the second differential circuit DA2 may operate in a differential mode.

As described above, the noise measuring electrode may include the first electrode and the second electrode spaced apart from each other to form the noise capacitor. The induced current may be relatively increased by the noise capacitor. The noise signal may be provided to the first node. The sensor driver may readily sense the inductive noise. Accordingly, the electronic device improved in sensing reliability and sensing accuracy may be provided.

As described above, the output terminal of the first different circuit may remove noise by superimposing the signals provided from the first input terminal and the second input terminal and canceling the noise signals, which are provided from the first input terminal and the second input terminal, from each other. Accordingly, an undesirable signal may be removed, and a desirable signal may not be distorted. The capacitive noise and the inductive noise may be removed from the sensor layer, based on the noise signal. The capacitive noise and the inductive noise may all be removed through the first differential circuit. The sensitivity of the sensor layer may be improved by increasing a signal-to-noise ratio (SNR). Accordingly, the electronic device may be provided with the noise component reduced or without the noise component. Accordingly, the electronic device improved in sensing reliability and sensing accuracy may be provided.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. An electronic device comprising:
a display layer;
a sensor layer disposed on the display layer and including an active region and a peripheral region adjacent to the active region; and
a sensor driver that drives the sensor layer, wherein
the sensor layer includes:
a plurality of sensing electrodes disposed in the active region;
a plurality of sensing lines disposed in the peripheral region and connected to the plurality of sensing electrodes, respectively; and
a noise measuring electrode disposed in the peripheral region,
the noise measuring electrode includes:
a first electrode spaced apart from the plurality of sensing electrodes, with the plurality of sensing lines interposed between the first electrode and the plurality of sensing electrodes; and
a second electrode adjacent to the first electrode, the second electrode and the first electrode form a noise capacitor, and
the sensor driver includes a first differential circuit including a first input terminal electrically connected to one of the plurality of sensing lines, and a second input terminal electrically connected to the first electrode;
wherein the noise capacitor formed between the first electrode and the second electrode is configured to provide a noise signal to the first differential circuit to remove noise from a receive signal received through one of the sensing lines.

2. The electronic device of claim 1, wherein the sensor layer further includes a resistance control circuit electrically connected between the first electrode and the second input terminal of the first differential circuit.

3. The electronic device of claim 2, wherein the resistance control circuit includes a variable resistor configured to adjust gain and phase of a conversion signal derived from noise signals sensed by the first electrode.

4. The electronic device of claim 2, further comprising:
a flexible substrate, wherein
the sensor driver is mounted on the flexible substrate, and the resistance control circuit is mounted on the flexible substrate.

5. The electronic device of claim 1, wherein the first electrode and the second electrode are disposed in different layers overlap each other in a plan view.

6. The electronic device of claim 5, wherein
the first electrode and the second electrode are spaced apart from the plurality of sensing lines in a first direction, in the plan view, and
each of the first electrode and the second electrode extends in a second direction intersecting the first direction.

7. The electronic device of claim 6, wherein each of the first electrode and the second electrode includes:
a first part extending in the second direction, adjacent to the sensor driver, and having a first width in the first direction; and
a second part extending in the second direction, spaced apart from the sensor driver with the first part interposed between the second part and the sensor driver, and having a second width greater than the first width in the first direction.

8. The electronic device of claim 5, wherein each of the first electrode and the second electrode includes:
a first part spaced apart from the plurality of sensing lines in a first direction and extending in a second direction intersecting the first direction; and
a second part extending from an end of the first part in the first direction.

9. The electronic device of claim 1, wherein
the first electrode and the second electrode are disposed in a same layer, and
the second electrode is electrically connected to a ground pad of the sensor driver.

10. The electronic device of claim 9, wherein the second electrode includes:
a first part spaced apart from the plurality of sensing lines in a first direction with the first electrode interposed between the first part and the plurality of sensing lines and extending in a second direction intersecting the first direction; and
a second part extending in the first direction from an end of the first part.

11. The electronic device of claim 1, wherein
the first electrode includes a first auxiliary electrode and a second auxiliary electrode, and
the first auxiliary electrode and the second auxiliary electrode are disposed in different layers and connected with each other through a contact hole.

12. The electronic device of claim 1, wherein
the first electrode and the second electrode are spaced apart from the plurality of sensing lines in a first direction in a plan view, and
each of the first electrode and the second electrode includes:
a first part extending in a second direction intersecting the first direction; and
a second part extending from the first part and having a patterned geometry.

13. The electronic device of claim 1, wherein
the sensor driver further includes a second differential circuit including a first input terminal connected to the one of the plurality of sensing lines, and a second input terminal connected to another one of the plurality of sensing lines, and
the first input terminal of the first differential circuit is connected to the second differential circuit.

14. The electronic device of claim 1, wherein the sensor driver further includes a filter connected to the first differential circuit.

15. An electronic device comprising:
a display layer; and
a sensor layer disposed on the display layer and including an active region and a peripheral region adjacent to the active region, wherein
the sensor layer includes:
a plurality of sensing electrodes disposed in the active region;

a plurality of sensing lines disposed in the peripheral region and connected to the plurality of sensing electrodes, respectively; and a noise measuring electrode disposed in the peripheral region, the noise measuring electrode includes:

a first electrode spaced apart from the plurality of sensing electrodes while the plurality of sensing lines interposed between the first electrode and the plurality of sensing electrodes; and a second electrode disposed under the first electrode and overlapping the first electrode in a plan view, and the first electrode and the second electrode form a noise capacitor;

wherein the noise capacitor is configured to provide a noise signal into a differential circuit to remove noise from a receive signal received through one of the sensing lines.

16. The electronic device of claim 15, further comprising:

a sensor driver including a first differential circuit including a first input terminal electrically connected to one of the plurality of sensing lines, and a second input terminal electrically connected to the first electrode.

17. The electronic device of claim 16, wherein the sensor layer further includes a resistance control circuit electrically connected between the first electrode and the second input terminal, and including a variable resistor configured to adjust a magnitude and phase of a conversion signal derived from noise signals sensed by the first electrode.

18. The electronic device of claim 15, wherein the first electrode and the second electrode are spaced apart from the plurality of sensing lines in a first direction in the plan view, and each of the first electrode and the second electrode extends in a second direction intersecting the first direction.

19. The electronic device of claim 15, wherein the first electrode and the second electrode are spaced apart from each other.

20. An electronic device comprising:

a display layer; and a sensor layer disposed on the display layer and including an active region and a peripheral region adjacent to the active region, wherein the sensor layer includes:

a plurality of sensing electrodes disposed in the active region;

a plurality of sensing lines disposed in the peripheral region and connected to the plurality of sensing electrodes, respectively; and a noise measuring electrode disposed in the peripheral region, the noise measuring electrode includes:

a first electrode spaced apart from the plurality of sensing electrodes while the plurality of sensing lines interposed between the first electrode and the plurality of sensing electrodes; and a second electrode disposed under the first electrode and overlapping the first electrode in a plan view, and the first electrode and the second electrode form a noise capacitor;

wherein the display layer includes an anode electrode, an emission layer disposed on the anode electrode, and a cathode electrode disposed on the emission layer, and a capacitance of the noise capacitor is greater than a capacitance of a parasitic capacitor formed between the first electrode and the cathode electrode.

* * * * *